(12) United States Patent
Yamada et al.

(10) Patent No.: US 9,876,940 B2
(45) Date of Patent: Jan. 23, 2018

(54) IMAGE PROCESSING APPARATUS AND IMAGE PROCESSING METHOD GENERATING QUANTIZED DATA BASED ON A DETERMINED PRINT OPERATION

(71) Applicant: CANON KABUSHIKI KAISHA, Tokyo (JP)

(72) Inventors: Akitoshi Yamada, Yokohama (JP); Shinichi Miyazaki, Kawasaki (JP); Masao Kato, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/040,449

(22) Filed: Feb. 10, 2016

(65) Prior Publication Data
US 2016/0248933 A1 Aug. 25, 2016

(30) Foreign Application Priority Data
Feb. 20, 2015 (JP) .................................. 2015-031836

(51) Int. Cl.
*H04N 1/52* (2006.01)
(52) U.S. Cl.
CPC ..................................... *H04N 1/52* (2013.01)
(58) Field of Classification Search
None
See application file for complete search history.

(56) References Cited

U.S. PATENT DOCUMENTS

| | | | | |
|---|---|---|---|---|
| 6,025,929 A | * | 2/2000 | Nakajima | H04N 1/4015 347/13 |
| 6,439,682 B1 | * | 8/2002 | Kakutani | H04N 1/40087 347/15 |
| 6,542,642 B2 | | 4/2003 | Takizawa | |
| 6,738,160 B1 | | 5/2004 | Kato | |
| 6,867,884 B1 | * | 3/2005 | Rozzi | H04N 1/52 358/1.9 |
| 7,099,046 B2 | | 8/2006 | Yamada | |
| 7,312,901 B2 | | 12/2007 | Yamada | |
| 7,548,346 B2 | | 6/2009 | Yamada | |

(Continued)

OTHER PUBLICATIONS

U.S. Appl. No. 14/971,271, filed Dec. 16, 2015.
(Continued)

*Primary Examiner* — Barbara Reinier
(74) *Attorney, Agent, or Firm* — Fizpatrick, Cella, Harper & Scinto

(57) ABSTRACT

An image processing apparatus has a determination unit that determines a print operation to be performed and a generation unit that generates quantized data for printing a dot by comparing a threshold value and the multi-valued data. In a case of performing a first print operation, dot arrangement of the multiple types of inks printed on the print medium by the print unit on a basis of pieces of quantized data generated by the generation unit is higher in exclusiveness and dispersibility between or among dots of the multiple types of inks and lower in an overlap rate between or among the dots of the multiple types of inks than dot arrangement of the multiple types of inks printed on the print medium by the print unit on a basis of the pieces of quantized data generated by the generation unit in the case of performing the second print operation.

34 Claims, 15 Drawing Sheets

(56) References Cited

U.S. PATENT DOCUMENTS

| | | |
|---|---|---|
| 7,672,011 B2 | 3/2010 | Kato |
| 7,855,809 B2 | 12/2010 | Kato |
| 7,859,723 B2 | 12/2010 | Yamada |
| 7,965,418 B2 | 6/2011 | Yamada |
| 8,503,031 B2 | 8/2013 | Kajihara |
| 8,619,319 B2 | 12/2013 | Tsuchiya |
| 8,830,530 B2 | 9/2014 | Sano |
| 9,087,291 B2 | 7/2015 | Hori |
| 9,092,720 B2 | 7/2015 | Nakagawa |
| 9,114,630 B1 * | 8/2015 | Hayashi ............... H04N 1/4051 |
| 9,135,536 B2 | 9/2015 | Miyazaki |
| 9,210,292 B2 | 12/2015 | Miyake |
| 2005/0031392 A1 * | 2/2005 | Yamamoto ............. B41J 11/009 400/62 |
| 2005/0185012 A1 * | 8/2005 | Yoshida ................. B41J 29/393 347/19 |
| 2010/0165366 A1 | 7/2010 | Ichimura |
| 2011/0085189 A1 * | 4/2011 | Sano .................... G06K 15/107 358/1.9 |
| 2011/0116115 A1 | 5/2011 | Kawatoko |
| 2015/0213344 A1 * | 7/2015 | Kiyohara .............. G06F 3/1211 358/3.06 |

OTHER PUBLICATIONS

U.S. Appl. No. 14/971,287, filed Dec. 16, 2015.
U.S. Appl. No. 14/971,277, filed Dec. 16, 2015.
U.S. Appl. No. 14/991,618, filed Jan. 8, 2016.
U.S. Appl. No. 15/014,935, filed Feb. 3, 2016.

* cited by examiner

| 0 | 8 | 2 | 10 |
| --- | --- | --- | --- |
| 12 | 4 | 14 | 6 |
| 3 | 11 | 1 | 9 |
| 15 | 7 | 13 | 5 |
FIG.6A
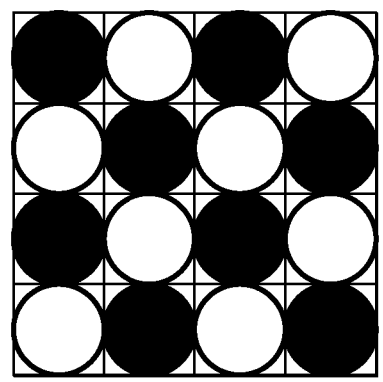
FIG.6B
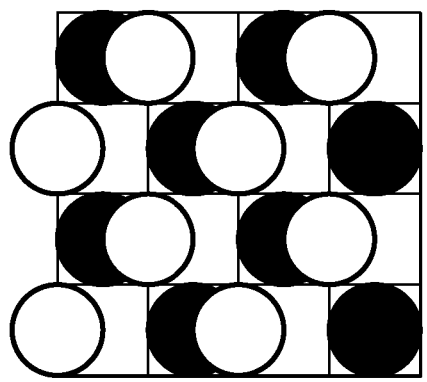
FIG.6C

| 0 | 8 | 2 | 10 |
|---|---|---|---|
| 12 | 4 | 14 | 6 |
| 3 | 11 | 1 | 9 |
| 15 | 7 | 13 | 5 |
FIG.7A
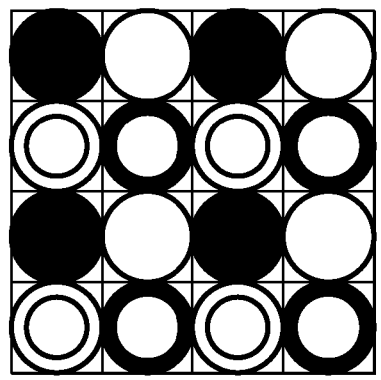
FIG.7B
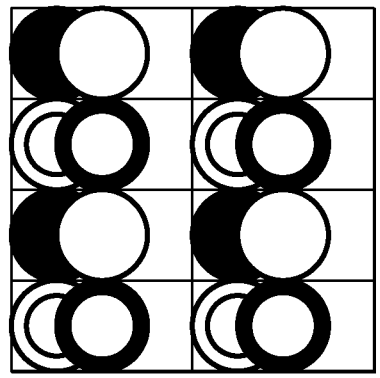
FIG.7C

FIG.8A
| 8 | 0 | 10 | 2 |
|---|---|----|---|
| 12 | 4 | 14 | 6 |
| 11 | 3 | 9 | 1 |
| 15 | 7 | 13 | 5 |
FIG.8B
| 12 | 8 | 14 | 10 |
|----|---|----|----|
| 0 | 4 | 2 | 6 |
| 15 | 11 | 13 | 9 |
| 3 | 7 | 1 | 5 |
FIG.8C
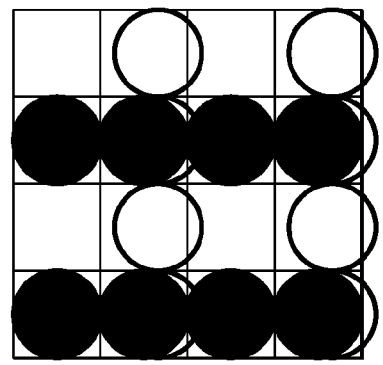
FIG.8D
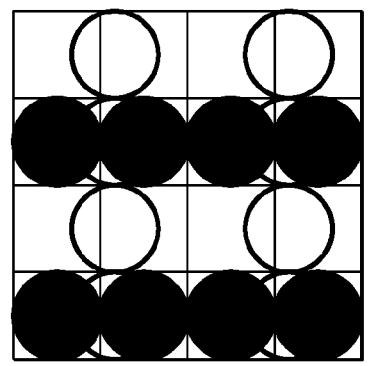

| FIRST DITHER PROCESS | SECOND DITHER PROCESS | REASON FOR SWITCHING |
|---|---|---|
| PHOTO PAPER | PLAIN PAPER | VARIATION IN HEAD-MEDIUM DISTANCE BY COCKLING |
| PAPER HAVING LARGE BLEEDING RATE | PAPER HAVING SMALL BLEEDING RATE | DIFFERENCE IN ROBUSTNESS AGAINST PRINT POSITION DISPLACEMENT |
| MULTIPASS | ONE-PASS | EFFECT OF EJECTION FREQUENCY ON AIR STREAM |
| LOW CARRIAGE SPEED | HIGH CARRIAGE SPEED | EFFECT OF ERROR ON PRINT POSITION DISPLACEMENT |
| LARGE DOT | SMALL DOT | DIFFERENCE IN ROBUSTNESS AGAINST PRINT POSITION DISPLACEMENT |
| MARGIN PRINTING | MARGINLESS PRINTING | PRINT POSITION DISPLACEMENT IN FRONT AND REAR ENDS |
| SINGLE-SIDED PRINTING | DOUBLE-SIDED PRINTING | EFFECT OF DIFFERENCE IN INK APPLICATION AMOUNT ON PRINT POSITION DISPLACEMENT |
| HIGH RESOLUTION | LOW RESOLUTION | MEMORY SIZE |
| SMALL HEAD-MEDIUM DISTANCE | LARGE HEAD-MEDIUM DISTANCE | EFFECT OF ERROR ON PRINT POSITION DISPLACEMENT |
| UNIDIRECTIONAL PRINTING | BIDIRECTIONAL PRINTING | EFFECT OF ERROR ON PRINT POSITION DISPLACEMENT |
| HIGH EJECTION SPEED | LOW EJECTION SPEED | EFFECT OF ERROR ON PRINT POSITION DISPLACEMENT |
| LARGE EFFECT OF VIBRATION | SMALL EFFECT OF VIBRATION | EFFECT OF VIBRATION ON PRINT POSITION DISPLACEMENT |
| LARGE NUMBER OF VARIATIONS IN SCANNING START POSITION | SMALL NUMBER OF VARIATIONS IN SCANNING START POSITION | EFFECT OF VARIATION IN SCANNING START POSITION ON PRINT POSITION DISPLACEMENT |

FIG.10

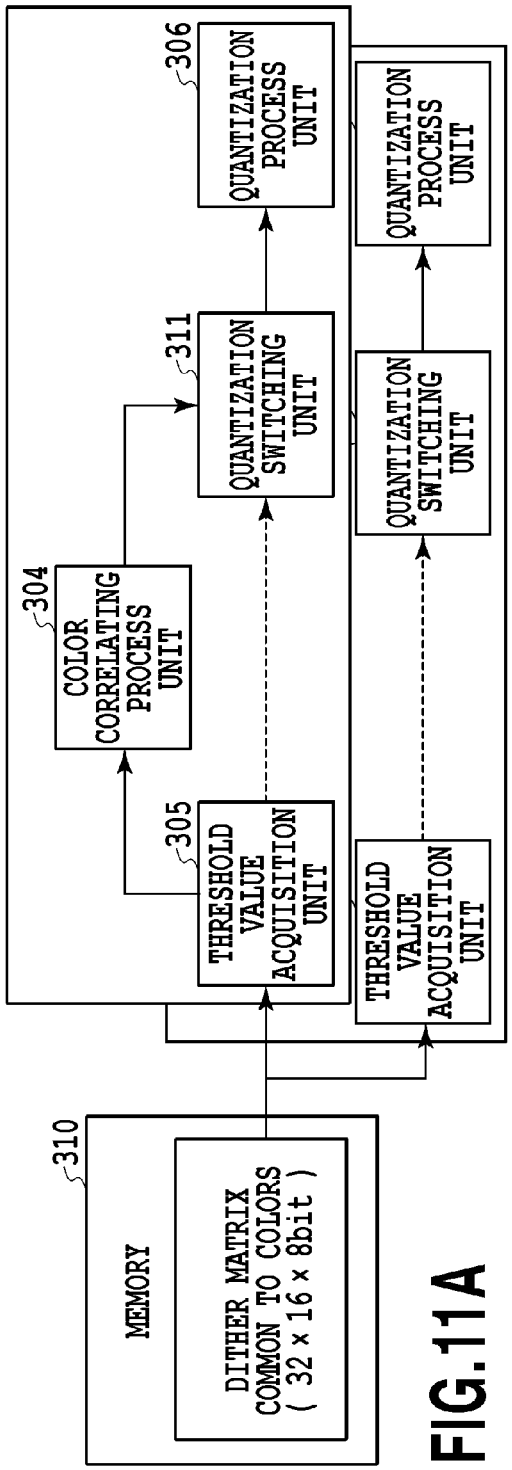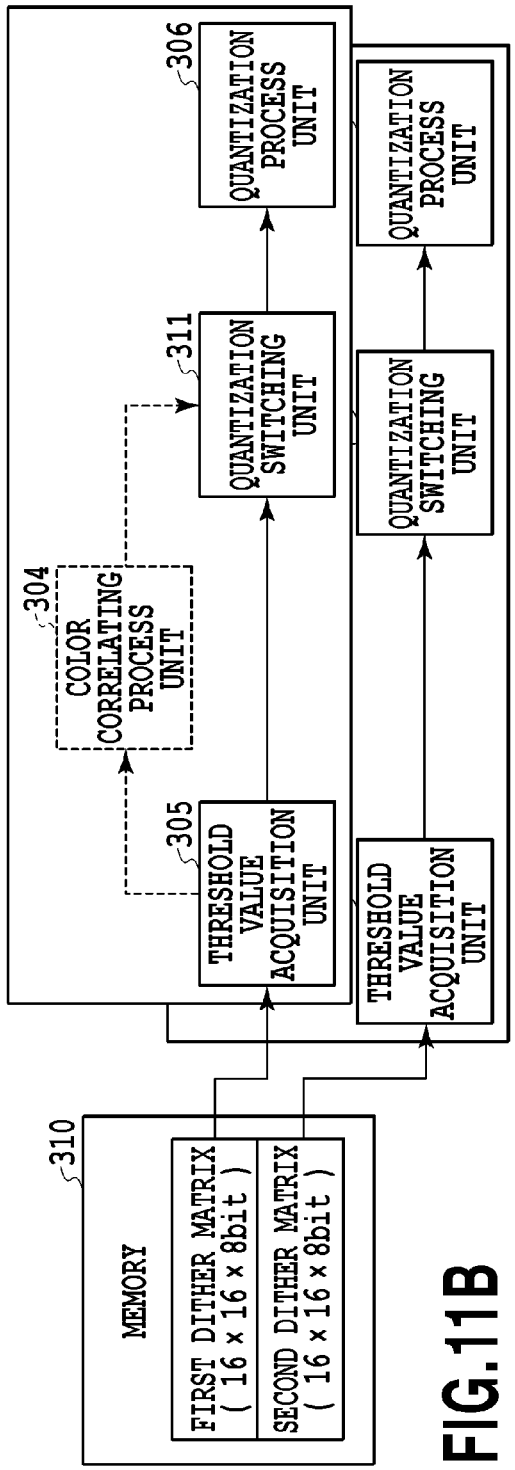

FIG.12A
| 0 | 8 | 2 | 10 |
|---|---|---|----|
| 12 | 4 | 14 | 6 |
| 3 | 11 | 1 | 9 |
| 15 | 7 | 13 | 5 |
FIG.12B
| 0 | <u>7</u> | 2 | 10 |
|---|---|---|----|
| 12 | 4 | 14 | 6 |
| 3 | 11 | 1 | 9 |
| 15 | <u>8</u> | 13 | 5 |
FIG.12C
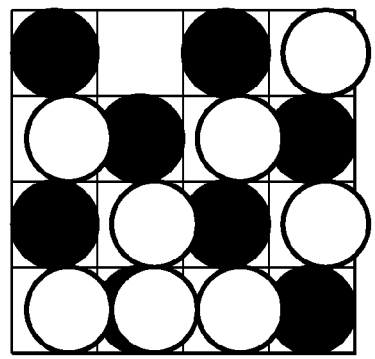
FIG.12D
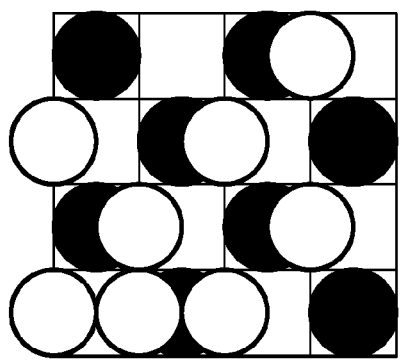

FIG.13A
| 8  | 0 | 10 | 2 |
|----|---|----|---|
| 12 | 4 | 14 | 6 |
| 11 | 3 | 9  | 1 |
| 15 | 7 | 13 | 5 |
FIG.13B
| 12 | <u>7</u> | 14 | 10 |
|----|----|----|----|
| 0  | 4  | 2  | 6  |
| 15 | 11 | 13 | 9  |
| 3  | <u>8</u> | 1 | 5 |
FIG.13C
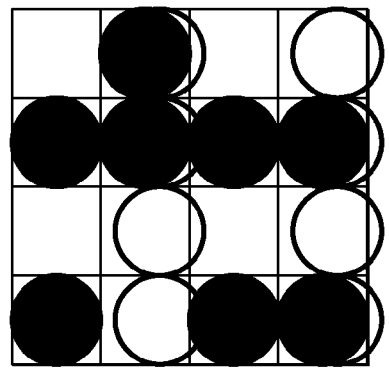
FIG.13D
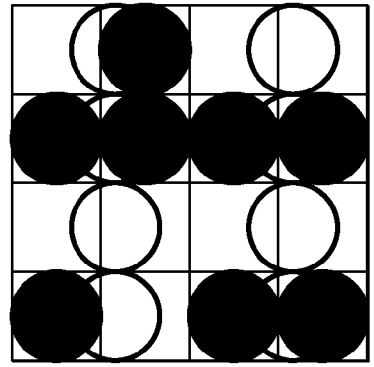

| 36 | 36 | 36 | 36 | 36 | 36 | 36 | 36 | 36 | 36 |
|----|----|----|----|----|----|----|----|----|----|
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |

| 24  | 138 | 55  | 230 | 183 | 66  | 238 | 189 | 75  | 25  |
|-----|-----|-----|-----|-----|-----|-----|-----|-----|-----|
| 215 | 180 | 12  | 158 | 88  | 207 | 115 | 4   | 155 | 215 |
| 121 | 71  | 248 | 106 | 45  | 26  | 168 | 59  | 250 | 43  |
| 157 | 33  | 134 | 189 | 220 | 143 | 229 | 93  | 135 | 109 |
| 196 | 224 | 84  | 7   | 120 | 71  | 183 | 16  | 204 | 66  |
| 17  | 60  | 164 | 209 | 53  | 246 | 105 | 39  | 162 | 244 |
| 112 | 251 | 98  | 145 | 31  | 172 | 139 | 215 | 80  | 121 |
| 215 | 175 | 23  | 199 | 235 | 88  | 10  | 190 | 54  | 224 |
| 77  | 50  | 133 | 72  | 116 | 59  | 126 | 232 | 26  | 145 |
| 157 | 192 | 228 | 0   | 178 | 208 | 151 | 99  | 169 | 86  |

# IMAGE PROCESSING APPARATUS AND IMAGE PROCESSING METHOD GENERATING QUANTIZED DATA BASED ON A DETERMINED PRINT OPERATION

BACKGROUND OF THE INVENTION

Field of the Invention

The present invention relates to an image processing apparatus, image processing method, and storage medium for performing a quantization process to form an image on a print medium.

Description of the Related Art

In the case of using a pseudo gradation method to print an image, it is necessary to quantize multi-valued image data, and as a quantization method used for the quantization, an error diffusion method and a dither method are known. In particular, the dither method that compares a preliminarily stored threshold value and a gradation value of multi-valued data with each other to determine dot printing or non-printing has a small processing load as compared with the error diffusion method, and is therefore widely used in many image processing apparatuses. In the case of such a dither method, in particular, dot dispersibility in a low gradation range becomes problematic; however, as a threshold value matrix for obtaining preferable dot dispersibility, a threshold value matrix having blue noise characteristics is proposed.

FIGS. 14A to 14C are diagrams for explaining a dither process using a threshold value matrix having blue noise characteristics. FIG. 14A illustrates an example of image data to be inputted into a 10-pixel×10-pixel area. This example shows a state where a gradation value of "36" is inputted to all the pixels. FIG. 14B illustrates a threshold value matrix prepared corresponding to the above 10-pixel× 10-pixel area. Each of the pixels is related to any of threshold values of 0 to 254. In the dither method, in the case where a gradation value indicated by multi-valued image data is larger than a threshold value, a corresponding pixel is designated as dot printing "1". On the other hand, in the case where a gradation value indicated by multi-valued image data is equal to or less than a threshold value, a corresponding pixel is designated as dot non-printing "0". FIG. 14C illustrates a quantization result based on the dither method. Pixels representing printing "1" are indicated in gray, and pixels representing non-printing "0" are indicated in white. The distribution of printing "1" pixels as seen in FIG. 14C is changed depending on threshold value arrangement in a threshold value matrix. By using the threshold value matrix having blue noise characteristics as in FIG. 14B, even in the case where the same pieces of multi-valued data are inputted into a predetermined area as in FIG. 14A, the printing "1" pixels are arranged in a high dispersibility state as in FIG. 14C. In addition, when a person visually observes such an image, dot deviation or periodicity is unlikely to be perceived, and the image can be recognized as a comfortable image.

However, even in the case of using a threshold value matrix having blue noise characteristics, in the case of printing an image using multiple color materials (i.e., mixed color), dispersibility is lost to make graininess conspicuous in some cases.

U.S. Pat. No. 6,867,884 discloses a dither method for solving such a problem. Specifically, U.S. Pat. No. 6,867,884 discloses a method that prepares one common dither matrix having preferable dispersibility, and performs a quantization process while shifting mutual threshold values among multiple colors. According to U.S. Pat. No. 6,867,884 as described, dots of different colors are mutually exclusively printed in a high dispersibility state in a low gradation range, and therefore even in the case of a mixed color image, preferable image quality can be achieved.

However, the method disclosed in U.S. Pat. No. 6,867,884 focuses on graininess and dispersibility in a mixed color image, but does not focus on any defect associated with print position displacement among color materials. That is, in a configuration where a print head is prepared for each of color materials to be printed, if relative print position displacement occurs among the print heads due to some cause, density unevenness and color unevenness are caused on an image. In addition, such unevenness is repeated with a period corresponding to the size of a dither matrix, and easily recognized as image defects.

SUMMARY OF THE INVENTION

The present invention is made in order to solve the above-described problem. Accordingly, an object of the present invention is to provide an image processing apparatus and method that in the case where print position displacement occurs among color materials, can prevent defects associated with the print position displacement from easily appearing on the image while achieving a mixed color image having suppressed graininess and superior dispersibility.

According to a first aspect of the present invention, there is provided an image processing apparatus for printing an image on a print medium by ejecting multiple types of mutually different inks from a print unit, the image processing apparatus comprising: a determination unit configured to, from among multiple print operations at least including a first print operation that performs printing with use of the print unit, and a second print operation of which a degree of occurrence of print position displacement on a print medium by the print unit is larger than the first print operation, determine a print operation to be performed; a data acquisition unit configured to acquire multi-valued data corresponding to a target pixel for each of the multiple types of inks; and a generation unit configured to, in accordance with the print operation that is determined by the determination unit and to be performed, generate quantized data for printing a dot by comparing a threshold value acquired by a threshold value acquisition unit, wherein the threshold value is arranged in a threshold value matrix providing an array of threshold values corresponding pixel positions and corresponds to the target pixel, and the multi-valued data with each other for each of the multiple types of inks; wherein in a case where the determination unit determines to perform the second print operation, the generation unit generates pieces of quantized data with use of threshold values obtained from threshold value matrices having mutually different threshold value arrangements respectively for the multiple types of inks, and wherein in a case where the determination unit determines to perform the first print operation, dot arrangement of the multiple types of inks printed on the print medium by the print unit on a basis of pieces of quantized data generated by the generation unit is higher in exclusiveness and dispersibility between or among dots of the multiple types of inks and lower in an overlap rate between or among the dots of the multiple types of inks than dot arrangement of the multiple types of inks printed on the print medium by the print unit on a basis of the pieces of quantized data generated by the generation unit in the case where the determination unit determines to perform the second print operation.

According to a second aspect of the present invention, there is provided an image processing apparatus for printing an image on a print medium by ejecting multiple types of mutually different inks from a print unit, the image processing apparatus comprising: a determination unit configured to, from among multiple print operations at least including a first print operation that performs printing with use of the print unit, and a second print operation of which a degree of occurrence of print position displacement on a print medium by the print unit is larger than the first print operation, determine a print operation to be performed; a data acquisition unit configured to acquire multi-valued data corresponding to a target pixel for each of the multiple types of inks; and a generation unit configured to, in accordance with the print operation that is determined by the determination unit and to be performed, generate quantized data for printing a dot by comparing a threshold value acquired by a threshold value acquisition unit, wherein the threshold value is arranged in a threshold value matrix providing an array of threshold values corresponding pixel positions and corresponds to the target pixel, and the multi-valued data with each other for each of the multiple types of inks; wherein: in the case where the determination unit determines to perform the first print operation, from a first threshold value matrix providing a first threshold value array common to the multiple types of inks, the threshold value acquisition unit acquires a threshold value corresponding to the target pixel, and with use of pieces of multi-valued data on the multiple types of inks, the generation unit offsets relative relationships between the threshold value and the pieces of multi-valued data respectively for the multiple types of inks, and on a basis of the offset relative relationships, generates pieces of quantized data for printing dots respectively for the multiple types of inks; and in the case where the determination unit determines to perform the second print operation, from second threshold value matrices separately respectively prepared for the multiple types of inks, the threshold value acquisition unit acquires threshold values corresponding to the target pixel, and the generating unit generates pieces of quantized data for printing dots by comparing the pieces of multi-valued data and corresponding ones of the threshold values respectively for the multiple types of inks.

According to a third aspect of the present invention, there is provided an image processing method for printing an image on a print medium by ejecting multiple types of mutually different inks from a print unit, the image processing method comprising: a determination step of, from among multiple print operations at least including a first print operation that performs printing with use of the print unit, and a second print operation of which a degree of occurrence of print position displacement on a print medium by the print unit is larger than the first print operation, determining a print operation to be performed; a data acquisition step of acquiring multi-valued data corresponding to a target pixel for each of the multiple types of inks; and a generation step of, in accordance with the print operation that is determined in the determination step and to be performed, generating quantized data for printing a dot by comparing a threshold value acquired by a threshold value acquisition unit, wherein the threshold value is arranged in a threshold value matrix providing an array of threshold values corresponding pixel positions and corresponds to the target pixel, and the multi-valued data with each other for each of the multiple types of inks; wherein in a case were the determination step determines to perform the second print operation, the generation step generates pieces of quantized data with use of threshold values obtained from threshold value matrices having mutually different threshold value arrangements respectively for the multiple types of inks, and wherein in a case where the determination step determines to perform the first print operation, dot arrangement of the multiple types of inks printed on the print medium by the print unit on a basis of pieces of quantized data generated by the generation step is higher in exclusiveness and dispersibility between or among dots of the multiple types of inks and lower in an overlap rate between or among the dots of the multiple types of inks than dot arrangement of the multiple types of inks printed on the print medium by the print unit on a basis of the pieces of quantized data generated by the generation step in the case where the determination unit determines to perform the second print operation.

Further features of the present invention will become apparent from the following description of exemplary embodiments (with reference to the attached drawings).

BRIEF DESCRIPTION OF THE DRAWINGS

FIGS. 6A to 6C are diagrams illustrating the results of the first dither process;
FIGS. 7A to 7C are diagrams illustrating the results of the first dither process;
FIGS. 8A to 8D are diagrams illustrating the results of a second dither process;
FIG. 10 is a diagram for explaining a specific example of determination for selecting a dither process;
FIGS. 11A and 11B are block diagrams illustrating dither processes in a second embodiment;
FIGS. 12A to 12D are diagrams illustrating a variations of a first dither process;
FIGS. 13A to 13D are diagrams illustrating a variation of a second dither process.

DESCRIPTION OF THE EMBODIMENTS

First Embodiment

Figure 1:
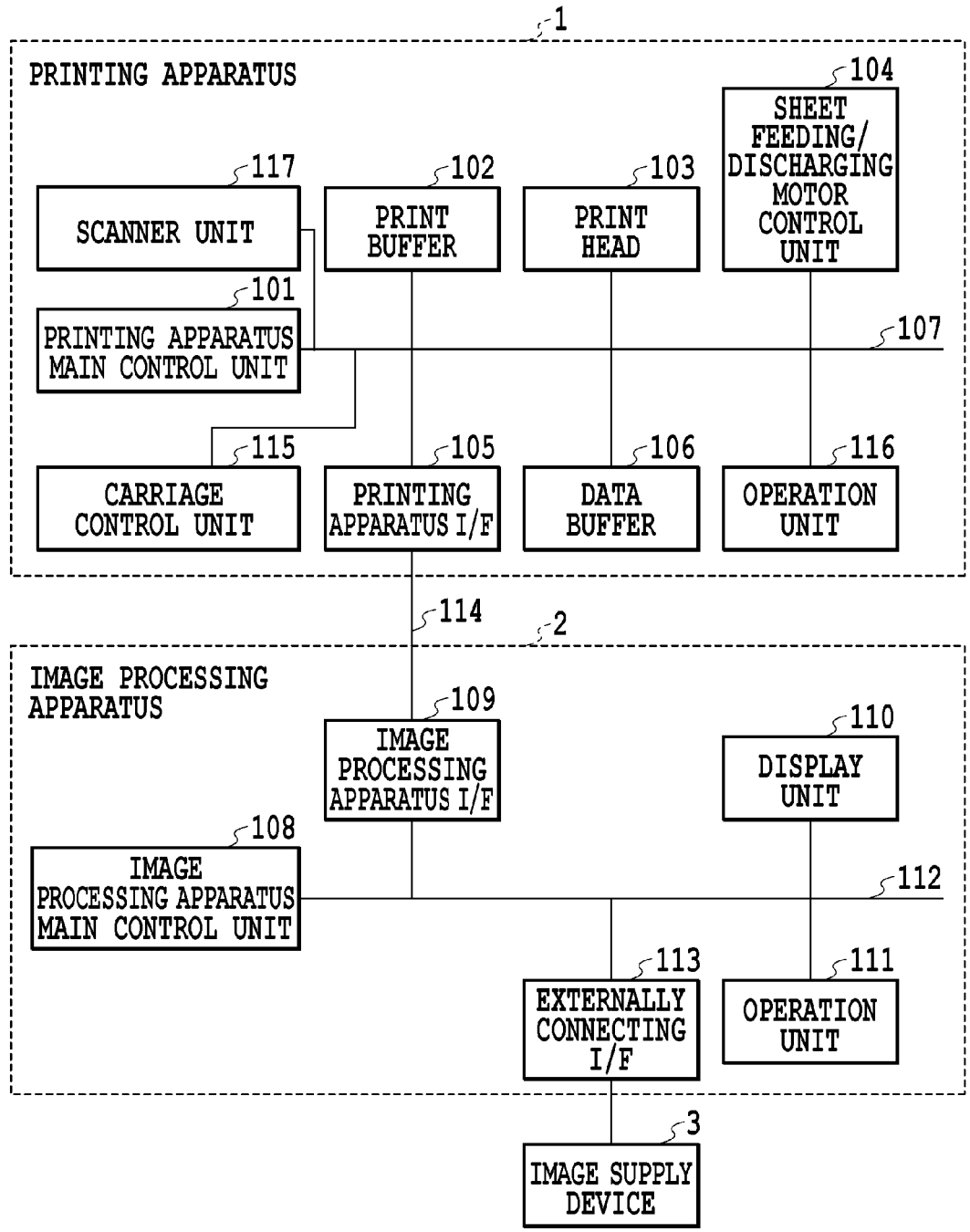
FIG. 1 is a block diagram illustrating the control configuration of an inkjet printing system.

FIG. 1 is a block diagram illustrating the control configuration of an inkjet printing system applicable to the present invention. The inkjet printing system in the present embodiment is configured to include an image supply device 3, an image processing apparatus 2, and an inkjet printing apparatus 1 (hereinafter also simply referred to as a printing apparatus). Image data supplied from the image supply device 3 is subjected to a predetermined image process in the image processing apparatus 2, then sent to the printing apparatus 1, and printed.

In the printing apparatus 1, a printing apparatus main control unit 101 is one for controlling the whole of the printing apparatus 1, and configured to include a CPU, ROM, RAM, and the like. The printing apparatus main control unit 101 can variously change a printing method depending on a set print mode. For example, when a marginless print mode is set, the printing apparatus main control unit 101 controls the ejection action of a print head 103 and the movement of a carriage to make it possible to perform the ejection action to the endmost part of a print medium. On the other hand, when a margin print mode is set, the printing apparatus main control unit 101 controls the ejection action of the print head 103 and the movement of the carriage so keep margins along the four sides of a print medium. Further, the printing apparatus main control unit 101 also controls the ejection action of the print head 103 and the conveyance action of a print medium to make it possible to perform a print action corresponding to a multipass number in a set print mode.

A print buffer 102 can store image data before transfer to the print head 103 as raster data. The print head 103 is an inkjet type print head having multiple printing elements capable of ejecting inks as droplets, and in accordance with image data stored in the print buffer 102, ejects inks from respective printing elements. In the present embodiment, it is assumed that printing element arrays for large dots of four colors of cyan, magenta, yellow, and black, and printing element arrays for small dots of the four colors, i.e., the eight printing element arrays are arrayed on the print head 103.

A carriage control unit 115 controls the carriage mounted with the print head 103 so as to move the carriage relatively to a print medium. For example, in the case where a high speed print mode and a high image quality print mode are prepared, the carriage control unit 115 controls the carriage so as to make the moving speed of the carriage in the high speed print mode higher than that in the high image quality print mode.

A sheet feeding/discharging motor control unit 104 controls conveyance of print media and sheet feeding/discharging. The printing apparatus 1 in the present embodiment is adapted to be able to print an image on multiple types of print media having different thicknesses and different friction coefficients, such as plain paper and photo paper, and the sheet feeding/discharging motor control unit 103 controls a sheet feeding/discharging motor appropriately for the type of a print medium to be fed. Also, in the case of printing images on both sides of a print medium, the sheet feeding/discharging motor control unit 104 reverses a print medium of which the front side is printed with an image, and conveys the print medium to a position where printing on the back side can be performed.

A printing apparatus interface (I/F) 105 transceives a data signal with the image processing apparatus 2. An I/F signal line 114 connects the both. As the I/F signal line 114, one specified by, for example, Centronics Data Computer Corporation can be applied. A data buffer 106 temporarily stores image data received from the image processing apparatus 2. A system bus 107 connects the respective functions of the printing apparatus 1. An operation unit 116 is a mechanism for a user to operate the printing apparatus, and can be applied with, for example, a power button and the like.

A scanner unit 117 is a unit that can optically read a set manuscript, and transfer read data to the printing apparatus main control unit 101. The scanner unit 117 may be of a flatbed type, or of an ADF type that reads a manuscript in conveyance by the sheet feeding/discharging motor control unit 104.

Figure 2:
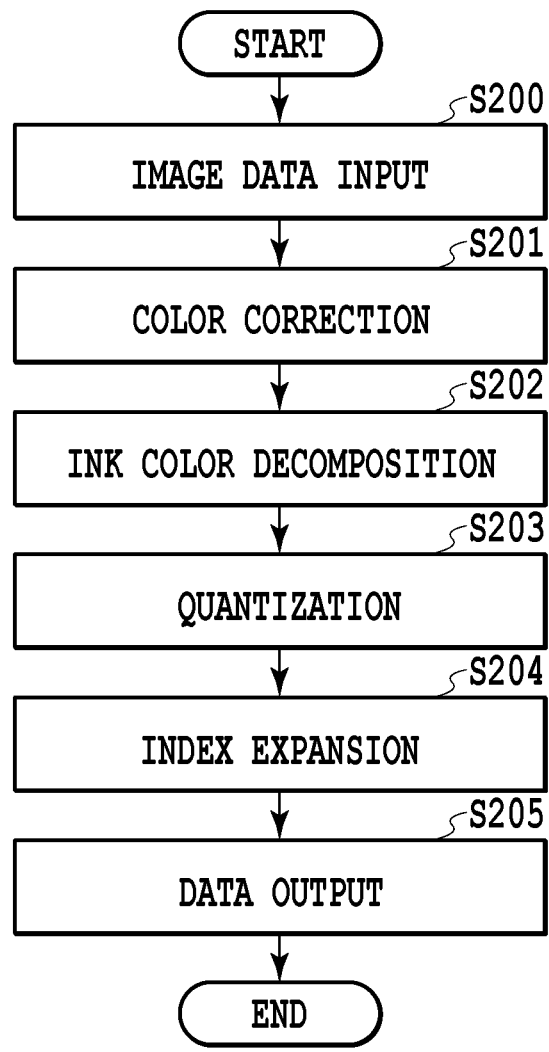
FIG. 2 is a flowchart for explaining an image data process.
Figure 3:
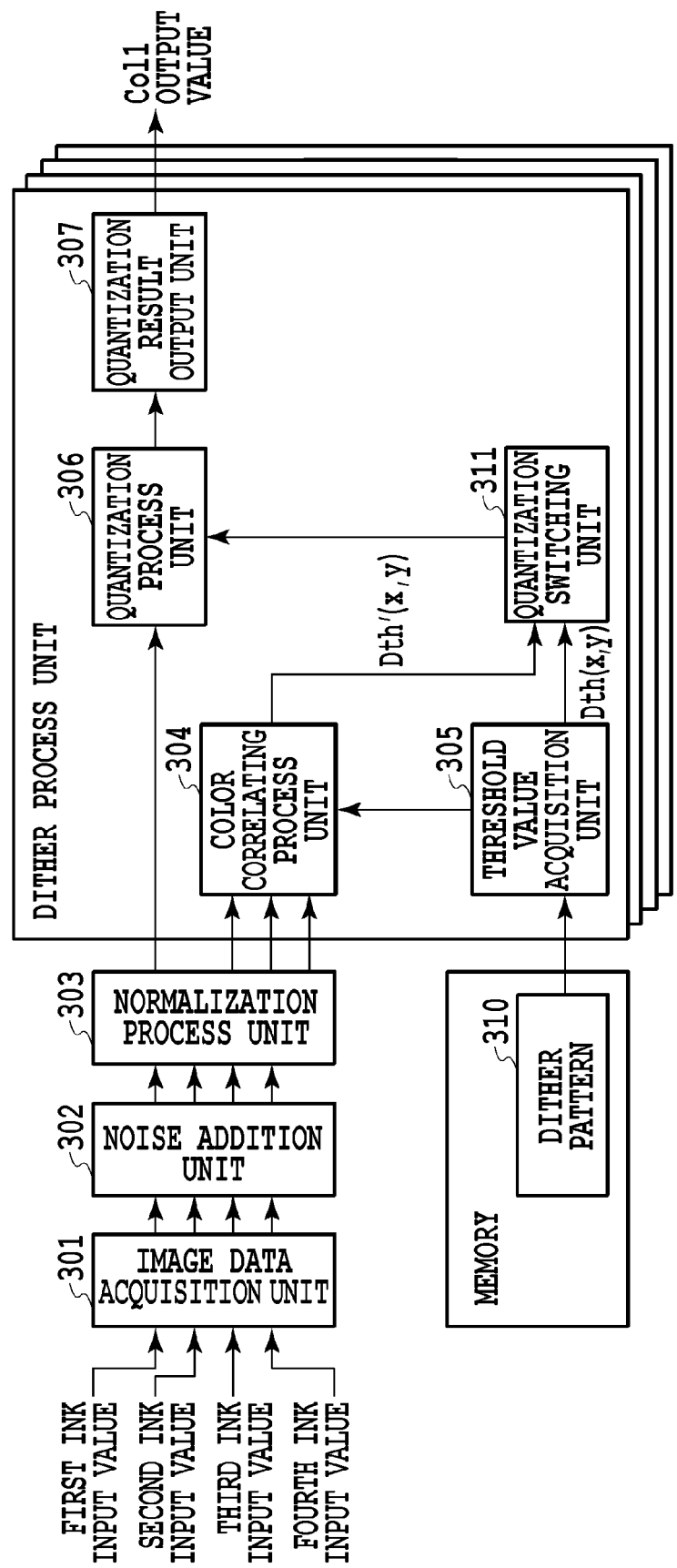
FIG. 3 is a block diagram for explaining the details of a quantization process.
Figure 4A:
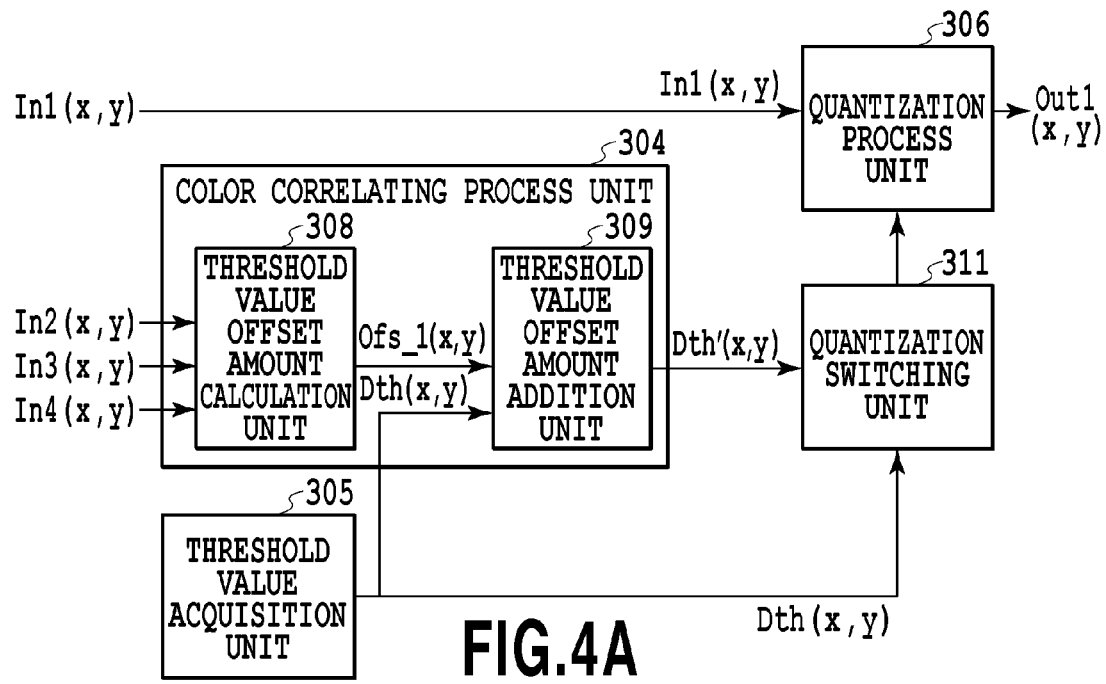
FIGS. 4A and 4B are diagrams illustrating the configuration of and processing steps by a color correlating process unit.
Figure 4B:
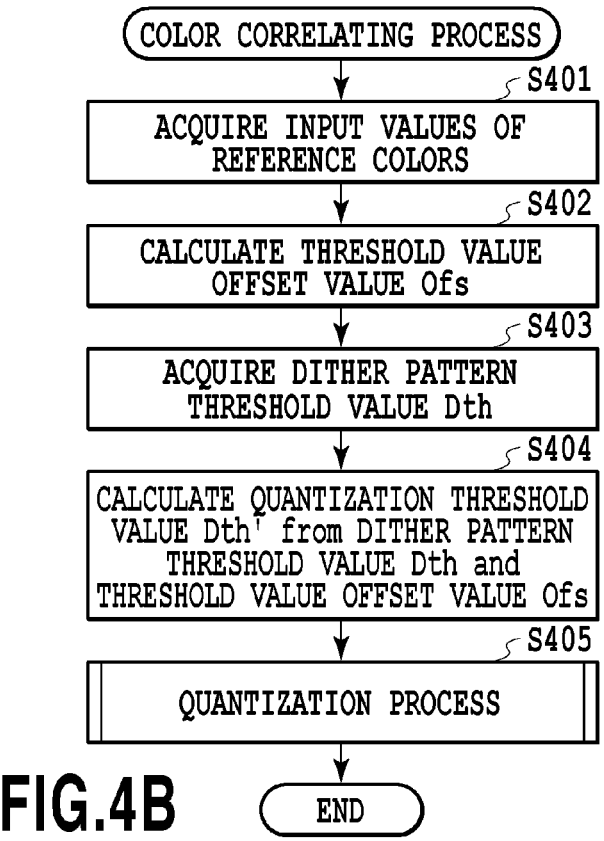
Figure 9:
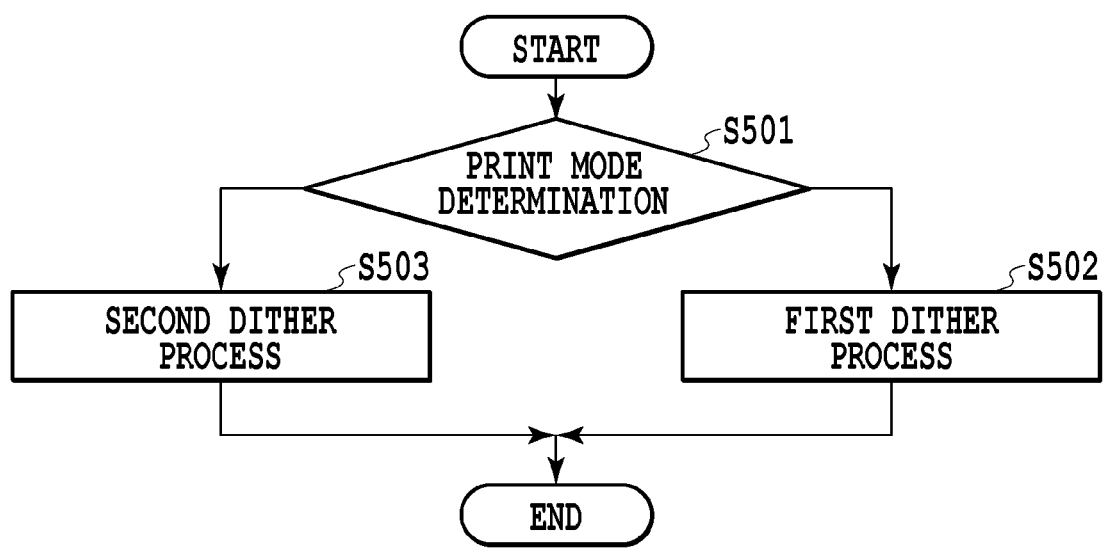
FIG. 9 is a flowchart for explaining a dither process selecting process.
Figures 14A, 14B, 14C:
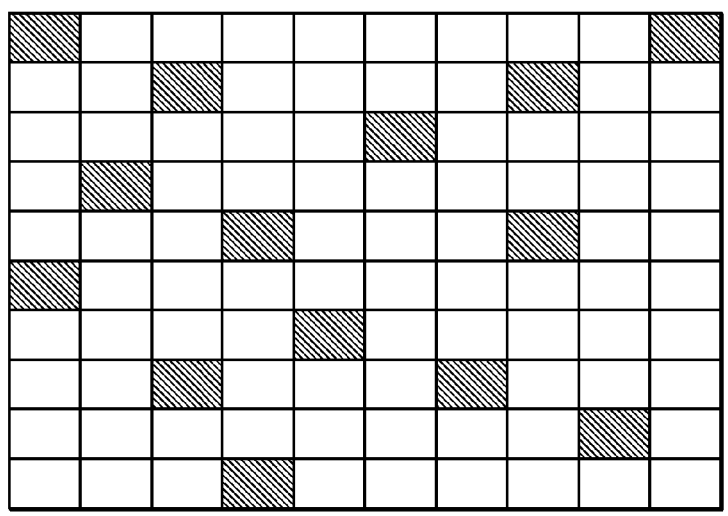
FIGS. 14A to 14C are diagrams illustrating a dither process having blue noise characteristics.

On the other hand, in the image processing apparatus 2, an image processing apparatus main control unit 108 is one for performing various processes on an image supplied from the image supply device 3, and thereby generating image data printable by the printing apparatus 1, and includes a CPU, ROM, RAM, and the like. The below-described characteristics configuration of the present invention illustrated in FIGS. 3 and 4A is also provided in the image processing apparatus main control unit 108, and flowcharts to be described with FIGS. 2, 4B, and 9 are performed by the CPU of the image processing apparatus main control unit 108. An image processing apparatus interface (I/F) 109 transceives a data signal with the printing apparatus 1. An externally connecting interface (I/F) 113 transceives image data and the like with the image supply device 3 externally connected. As the image supply device, a digital camera or the like can be cited; however, in the case where the inkjet printing system in the present embodiment has a copy function, an incorporated scanner device is also connected to the image supply device. A display unit 110 displays various pieces of information to a user, and can be applied with a display such as an LCD. An operation unit 111 is a mechanism for a user to perform a command operation, and can be applied with, for example, a keyboard and a mouse. A system bus 112 connects the image processing apparatus main control unit 108 and the respective functions to each other.

The image processing apparatus main control unit 108 is adapted to be able to selectively switch between a first dither process that mutually exclusively arranges dots of multiple ink colors and a second dither process that arranges dots in a mutually uncorrelated or low correlated state. These two dither processes will be described later in detail.

FIG. 2 is a flowchart for explaining an image data process performed by the image processing apparatus main control unit 108 in the present embodiment. This process is performed by the CPU provided in the image processing apparatus main control unit 108 in accordance with a program stored in the ROM. In FIG. 2, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing standardized color space such as sRGB. In Step S201, these pieces of luminance data are converted to pieces of RGB 12-bit luminance data corresponding to color space specific to the printing apparatus 1. As a method for converting a signal value, a publicly known method such as a method that refers to a lookup table (LUT) preliminarily stored in the ROM or the like can be employed.

In Step S202, the image processing apparatus main control unit 108 decomposes the converted pieces of RGB data to pieces of 16-bit gradation data (density data) respectively for C (cyan), M (magenta), Y (yellow), and K (black) that are the ink colors of the printing apparatus. In this step, a 16-bit gray image is generated for each of four channels (four colors). In the ink color decomposition process as well, a lookup table (LUT) preliminarily stored in the ROM or the like can be referred to as in the color correction process.

In Step S203, the image processing apparatus main control unit 108 performs a predetermined quantization process on the pieces of 16-bit gradation data respectively corresponding to the ink colors to convert to pieces of several bit quantized data. For example, in the case of quantization into 3-level data, the image processing apparatus main control unit 108 converts the pieces of 16-bit gradation data to pieces of 2-bit data each corresponding to any of Level 0 to Level 2. The quantization process will be described later in detail.

In subsequent Step S204, the image processing apparatus main control unit 108 performs an index expansion process. Specifically, from among multiple dot arrangement patterns where the number of dots to be printed in each pixel and a corresponding position are determined, one dot arrangement pattern is selected related to a level obtained in Step S203. Then, resultant pieces of dot data are outputted as pieces of binary data (Step S205). This completes the image data process.

FIG. 3 is a block diagram for explaining the details of the quantization process performed in Step S203 of FIG. 2. The quantization process in the present invention is performed in accordance with a dither method. In the quantization process in the present embodiment, an input value is first processed, then a threshold value is processed, and finally the quantization process is performed. These series of processes are parallel performed on a color basis (on a plane basis). In the following, each of the processes will be described in detail with reference to FIG. 3.

An image data acquisition unit 301 acquires pieces of 16-bit gradation data indicating the density of each pixel. It is assumed that the image data acquisition unit 301 in the present embodiment can receive signals having at most 16 bits for eight colors. The diagram illustrates a state where the pieces of 16-bit data respectively on first to fourth inks are inputted.

A noise addition process unit 302 adds predetermined noise to the pieces of 16-bit gradation data. By adding the noise, even in the case where pieces of gradation data of the same level are continuously inputted, a state where the same patterns are continuously arranged can be avoided to reduce a stripe, texture, and the like. The noise addition process unit 302 multiplies a predetermined random table, fixed intensity, and variable intensity corresponding to an input value, and thereby noise is generated for each pixel and added to the input value. Note that the random table is a table adapted to set the polarity of noise, and sets a plus, zero, or a minus for each pixel position. The random table in the present embodiment can have at most eight faces, and the size of each table can be arbitrarily set. The fixed intensity indicates the intensity of a noise amount, and the magnitude of the intensity determines whether noise is large or small. In the present embodiment, by setting a random table or fixed intensity optimum for each print mode depending on the graininess of, the degrees of stripe and texture of an image, and the like, a noise amount can be appropriately adjusted.

A normalization process unit 303 relates a gradation value of each pixel represented by 16 bits to a level value enabling the index expansion in Step S204, and then normalizes each level range to 12 bits. In the following, a specific description will be given. In the case where the index expansion process in Step S204 is a process corresponding to n values from Level 0 to Level (n−1), the normalization process unit 303 equally divides 65535 gradations represented by 16 bits into (n−1). Further, a range corresponding to each level is normalized to 12 bits (4096 gradations). This makes it possible to, for each pixel, obtain pieces of 12-bit data related to any of Level 0 to Level (n−1).

For example, in the case where the index expansion process corresponds to three values of Level 0, Level 1, and Level 2, the normalization process unit 303 equally divides the 65535 gradations represented by 16 bits into two. Then, the normalization process unit 303 normalizes respective ranges corresponding to gradation values of 0 to 32767 and gradation values of 32768 to 65535 to 12 bits (0 to 4095 gradations). For a pixel corresponding to any of the input gradation values of 0 to 32767 as the first range, Level 0 or Level 1 is outputted by the subsequent quantization process, whereas for a pixel corresponding to any of the input gradation values of 32768 to 65535 as the second range, Level 1 or Level 2 is outputted by the subsequent quantization process. In accordance with the above-described control, even in the case where a quantization number (n) is any number, the subsequent quantization process can be performed in the same manner.

The processes in the image data acquisition unit 301 to the normalization process unit 303 described above are parallel performed on the pieces of gradation data on the respective colors. That is, in the present embodiment, the pieces of 12-bit data on black, cyan, magenta, and yellow are generated, and inputted to a dither process unit.

In the dither process unit, the two types of dither processes, i.e., the first dither process that is a process exclusive among the colors and the second dither process that is a process in the low correlated state, are performable. 12-bit data to be quantized (processing target data) is directly transmitted to a quantization process unit 306. On the other hand, pieces of 12-bit data on colors other than the processing target data are inputted to a color correlating process unit 304 as pieces of reference data.

A threshold value acquisition unit 305 selects a threshold value matrix corresponding to a print mode from among threshold value matrices stored in a memory 310 such as the ROM, and acquires a threshold value corresponding to a pixel position associated with the processing target data. In the present embodiment, the threshold value matrix is a threshold value matrix formed by arraying multiple threshold values, and can provide various sizes and shapes such as 512×512 pixels, 256×256 pixels, and 512×256 pixels. That is, the memory 310 preliminarily stores the multiple threshold value matrices having different sizes and shapes as described, and the threshold value acquisition unit 305 selects a threshold value matrix corresponding to a print mode from among the multiple threshold value matrices.

In the case where the first dither process is set, the threshold value acquisition unit 305 selects a first threshold value matrix, and from among multiple threshold values arrayed in the threshold value matrix, provides a threshold value corresponding to the pixel position (x, y) associated with the processing target data to the color correlating process unit 304. In the case where the second dither process is set, the threshold value acquisition unit 305 selects a second threshold value matrix, and from among multiple threshold values arrayed in the threshold value matrix, provides a threshold value corresponding to the pixel position (x, y) associated with the processing target data to a quantization process switching unit 311. In the present embodiment, the first threshold value matrix is assumed to be a threshold value matrix that has blue noise characteristics and is common to the respective colors (respective planes). On the other hand, the second threshold value matrix is assumed to be a threshold value matrix that is independent for each of the colors (each of the planes). The second threshold value matrix may be a threshold value matrix that has low correlation among the respective colors and provides dot arrangement of a halftone dot shape to halftone multi-valued data, or a threshold value matrix that has blue noise characteristics and is different for each of the colors.

The color correlating process unit 304 performs a predetermined process on the threshold value for the first dither process acquired by the threshold value acquisition unit 305 on the basis of the pieces of reference data to determine a final threshold value, and transmits the final threshold value to the quantization process switching unit 311. The quantization process switching unit 311 selects any one of the threshold value obtained from the color correlating process unit 304 and the threshold value directly obtained from the threshold value acquisition unit 305 on the basis of a print mode, and provides the selected one to the quantization process unit 306. The quantization process unit 306 compares the processing target data with the threshold value inputted from the quantization process switching unit 311, and thereby determines printing (1) or non-printing (0).

In the following, a method for determining a threshold value in the color correlating process unit 304 will be described in detail.

FIGS. 4A and 4B are a block diagram of the color correlating process unit 304, and a flowchart for explaining processing steps in the case where the first dither process is performed. The color correlating process unit 304 sets the pieces of 12-bit data corresponding to the colors other than the processing target data as the pieces of reference data, uses these pieces of reference data to perform the predetermined process on the threshold value acquired by the threshold value acquisition unit 305, and calculates the threshold value for quantizing the processing target data. For example, in the case where the processing target data is 12-bit data on black, the pieces of reference data are pieces of 12-bit data on cyan, magenta, and yellow. In FIGS. 3 and 4, the processing target data is denoted by $In1(x, y)$, and the pieces of reference data are denoted by $In2(x, y)$, $In3(x, y)$, and $In4(x, y)$. Here, (x, y) represents the pixel position, which serves as a coordinate parameter for the threshold value acquisition unit 305 to select the threshold value corresponding to the pixel position associated with the processing target data from the threshold value matrix.

Referring to FIG. 4A, the pieces of reference data $In2(x, y)$ to $In4(x, y)$ inputted to the color correlating process unit 304 are first inputted to a threshold value offset amount calculation unit 308 (Step S401). In doing so, the threshold value offset amount calculation unit 308 uses these pieces of reference data to calculate a threshold value offset Ofs_1 $(x, y)$ for the processing target data $In1(x, y)$ (Step S402). In the present embodiment, the threshold value offset value Ofs_1 $(x, y)$ is calculated in accordance with Expression 2.

$$Ofs\_1(x,y) = \Sigma i[Ini(x,y)] \quad \text{(Expression 2)}$$

Here, i represents a parameter individually indicating, among the pieces of reference data $In2(x, y)$ to $In4(x, y)$, one or more pieces of reference data (hereinafter referred to as pieces of actual reference data) used to obtain the threshold value for the processing target data In1. The number and type of such pieces of actual reference data are predesignated for each processing target data.

In the present embodiment, it is assumed that in the case where the processing target data is $In1(x, y)$, a null is the actual reference data, and in the case where the processing target data is $In2(x, y)$, $In1(x, y)$ is the actual reference data. It is also assumed that in the case where the processing target data is $In3(x, y)$, $In1(x, y)$ and $In2(x, y)$ are the pieces of actual reference data, and in the case where the processing target data is $In4(x, y)$, $In1(x, y)$, $In2(x, y)$, and $In3(x, y)$ are the pieces of actual reference data. Accordingly, offsets Ofs_1$(x, y)$ to Ofs_4$(x, y)$ for the respective pieces of processing target data $In1(x, y)$ to $In4(x, y)$ can be expressed as follows in accordance with Expression 2.

$$Ofs\_1(x, y) = \Sigma i[In(x, y)] \quad \text{(Expression 2-1)}$$
$$= 0$$

$$Ofs\_2(x, y) = \Sigma i[In(x, y)] \quad \text{(Expression 2-2)}$$
$$= In1(x, y)$$

$$Ofs\_3(x, y) = \Sigma i[In(x, y)] \quad \text{(Expression 2-3)}$$
$$= In1(x, y) + In2(x, y)$$

$$Ofs\_4(x, y) = \Sigma i[In(x, y)] \quad \text{(Expression 2-4)}$$
$$= In1(x, y) + In2(x, y) + In3(x, y)$$

As described, when the threshold value offset values Ofs_1$(x, y)$ to Ofs_4$(x, y)$ are calculated, these values are inputted to a threshold value offset amount addition unit 309. On the other hand, the threshold value offset amount addition unit 309 acquires a threshold value Dth corresponding to the coordinates (x, y) of processing target data In(x, y) from the threshold value acquisition unit 305 (Step S403).

In Step S404, the threshold value offset amount addition unit 309 subtracts the threshold value offset value Ofs_1$(x, y)$ inputted from the threshold value offset amount calculation unit 308 from the threshold value Dth(x, y) inputted from the threshold value acquisition unit 305 to obtain a quantization threshold value Dth'(x, y).

$$Dth'(x,y) = Dth(x,y) - Ofs\_1(x,y) \quad \text{(Expression 3)}$$

In so doing, in the case where Dth'(x, y) takes a minus value, Dth_max (the maximum value among threshold values in the dither pattern) is added, and a resultant value is treated as the quantization threshold value Dth'(x, y). In doing so, the quantization threshold value Dth' is constantly Dth'=0 to Dth_max.

That is, in the case where Dth'(x, y)<0, the following expression holds:

$$Dth'(x,y) = Dth'(x,y) + Dth\_max \quad \text{(Expression 4)}$$

The quantization threshold value Dth'(x, y) obtained in accordance with Expression 3 or 4 is transmitted to the quantization process unit 306 through the quantization process switching unit 311 as a correction threshold value for each color.

In Step S405, the quantization process unit 306 compares the processing target data $In1(x, y)$ and the quantization threshold value provided from the quantization process switching unit 311 with each other to determine dot printing (1) or non-printing (0) for the pixel position (x, y). This completes the processing steps.

After that, as described with the flowchart in FIG. 2, quantized data Out1$(x, y)$ represented by several bits is subjected to the index expansion process, and a dot pattern to be printed at the pixel position (x, y) is determined. In so doing, the number of dots to be printed at the pixel position (x, y) is set to be a number corresponding to a level value, such as one dot when the level value is 1, or two dots when the level value is 2.

Figure 5:
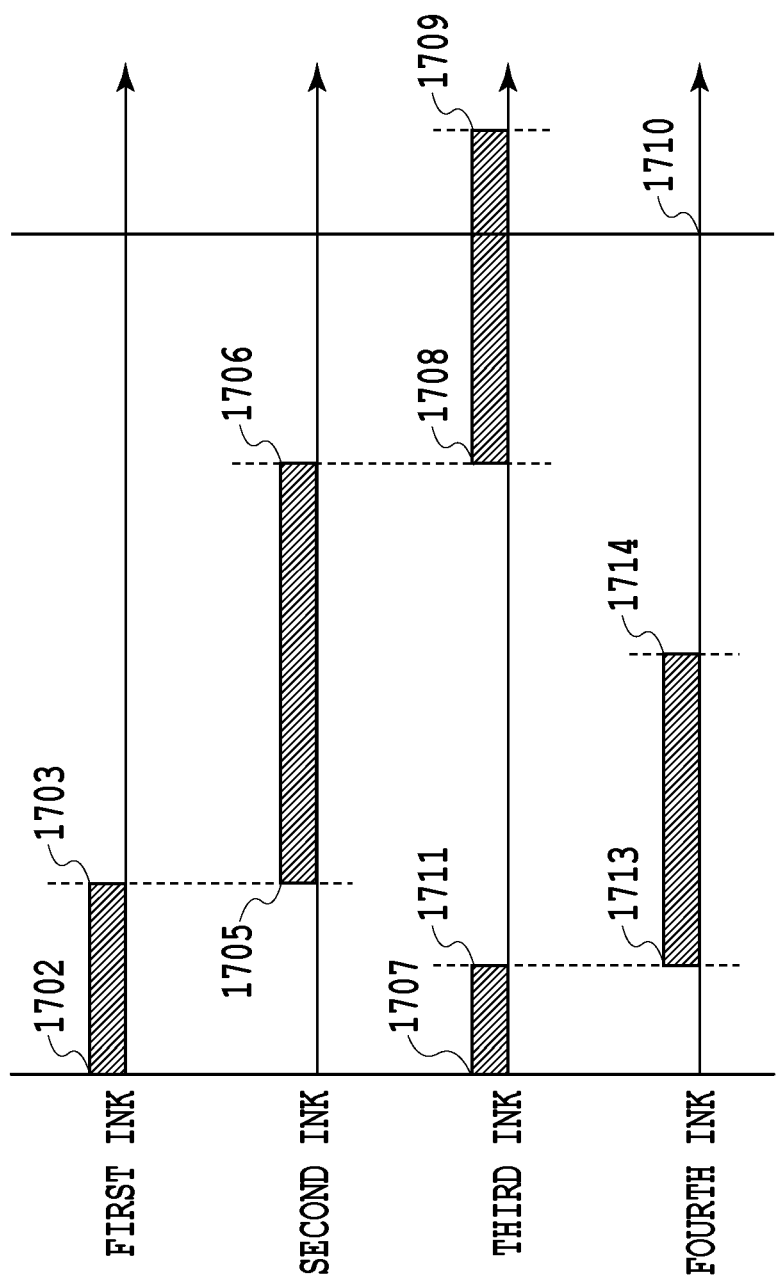
FIG. 5 is a diagram illustrating threshold value ranges determined as printing (1) by a first dither process on a color basis.

FIG. 5 is a diagram illustrating a quantization result obtained when the first dither process is performed. Also, FIG. 5 illustrates threshold value ranges determined as printing (1) among the multiple threshold values 0 to Dth_max arranged in the dither pattern 310 when the first to fourth pieces of multi-valued data (In1 to In4) are respectively inputted for the first to fourth inks. The horizontal axis represents a threshold value 0 to 4094, and "1710" represents Dth_max (the maximum value among the threshold values in the dither pattern). Each thick line indicates a threshold value range where dots are arranged. In the present embodiment, the offset for the first ink is Ofs_1=0 from Expression 2-1. Accordingly, pixel positions each corresponding to any of threshold values of 0 to In1 (1702 to 1703) among 0 to Dth_max are set to printing (1).

The offset for the second ink is Ofs_2=In1 from Expression 2-2. Accordingly, as a result of quantization using the threshold value Dth' obtained in accordance with Expressions 3 and 4, threshold values of In1 to In1+In2 (1705 to 1706) among the threshold values 0 to Dth_max arrayed in the dither pattern 310 are set to printing (1).

The offset for the third ink is Ofs_3=In1+In2 from Expression 2-3. Accordingly, as a result of quantization using the threshold value Dth' obtained in accordance with Expressions 3 and 4, In1+In2 to In1+In2+In3 (1708 to 1709) among the threshold values 0 to Dth_max arrayed in the dither pattern 310 are set to printing (1). Note that in this example, (In1+In2+In3) is assumed to exceed Dth_max. In this case, a range exceeding Dth_max is treated as follows. That is, a range corresponding to the remainder obtained by dividing (In1+In2+In3) by Dth_max, i.e., threshold values of 0 to In1+In2+In3−Dth_max are set to printing (1). In other words, In1+In2 to Dth_max (1708 to 1710) and 0 to In1+In2+In3−Dth_max (1707 to 1711) are threshold value ranges determined as printing (1).

The offset for the fourth ink is Ofs_4=In1+In2+In3 from Expression 2-4. Accordingly, as a result of quantization using the threshold value Dth' obtained in accordance with Expressions 3 and 4, In1+In2+In3 to In1+In2+In3+In4 among the threshold values 0 to Dth_max arrayed in the dither pattern 310 are threshold values set to printing (1). Note that in this example, the entire range of In1+In2+In3 to In1+In2+In3+In4 exceeds Dth_max. Therefore, a range corresponding to the remainder obtained by dividing (In1+In2+In3+In4) by Dth_max, i.e., threshold values of In1+In2+In3−Dth_max to In1+In2+In3+In4−Dth_max (1713 to 1714) are set to printing (1).

As described, in the first dither process, despite using the common threshold value Dth, the quantization threshold values Dth' specific to the respective colors are obtained by setting the mutual input values as the offset values. Further, by using the newly obtained quantization threshold values Dth' for the quantization process, even in the case where a dot print pattern where the multiple colors are mixed, dot arrangement having blue noise characteristics can be achieved.

Meanwhile, a result of determining printing (1) or non-printing (0) in the quantization process unit 306 is based on the relative comparison between processing target data and a threshold value, and therefore the offset process performed above can be performed not on a threshold value but also on processing target data.

Figure 15:
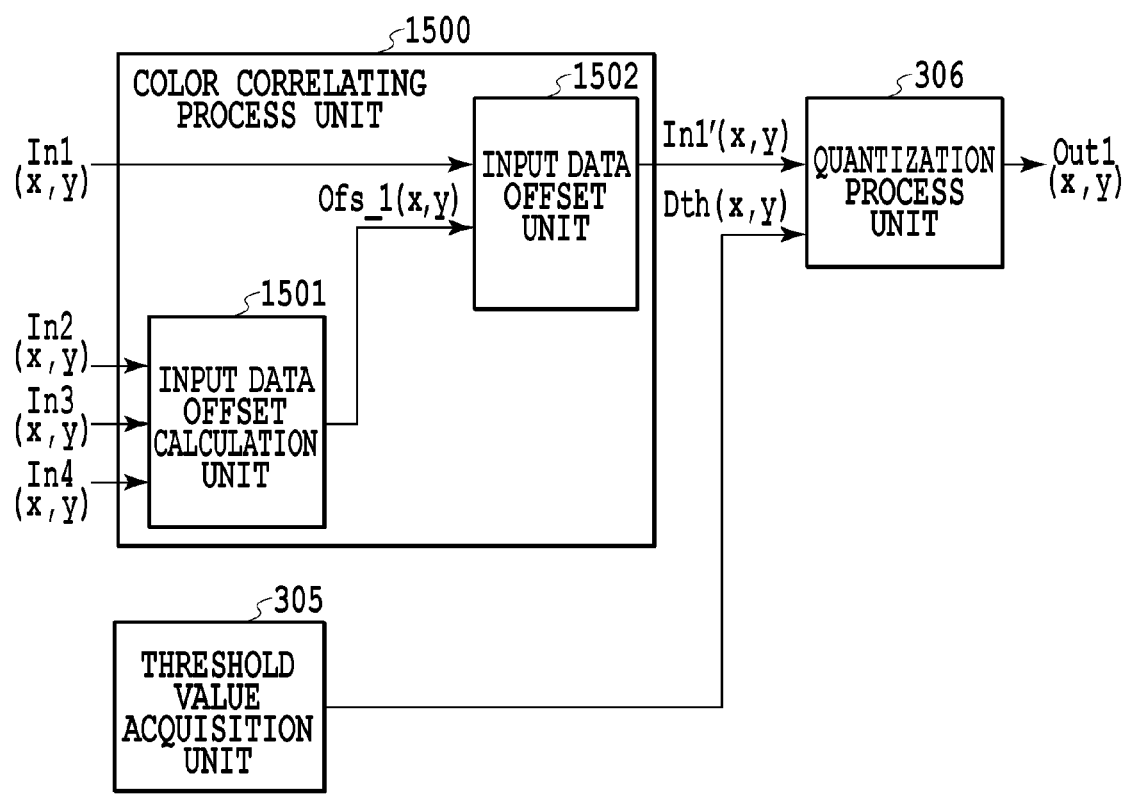
FIG. 15 is diagram illustrating the configuration of a color correlating process unit.

FIG. 15 is a block diagram for explaining the configuration and steps of a process in a color correlating process unit in such a case. The color correlating process unit 1500 uses the pieces of reference data other than the processing target data to perform a predetermined process on the processing target data, and thereby calculates correction data. Specifically, an input data offset amount calculation unit 1501 first calculates an offset amount Ofs_1(x, y) based on the pieces of reference data In2(x, y) to In4(x, y). In so doing, the offset amount Ofs_1(x, y) can be made to have the same value as that of the offset amount Ofs_1(x, y) described in the above example. An input data offset amount addition unit 1502 adds the offset amount Ofs_1(x, y) to the processing target data (x, y) to thereby generate correction data In1'(x, y), and transmits the correction data In1'(x, y) to the quantization process unit 306. The quantization process unit 306 compares the correction data In1'(x, y) with the threshold value Dth(x, y) acquired by the threshold value acquisition unit 305, and thereby determines printing (1) or non-printing (0).

In FIGS. 4A and 4B, the threshold value offset value Ofs_1(x, y) is subtracted from the threshold value acquired by the threshold value acquisition unit 305, and the resultant corrected threshold value and the processing target data are compared with each other. On the other hand, in the example of FIG. 15, the threshold value is not changed, and the correction data resulting from adding the data offset amount to the processing target data is compared with the threshold value. In such a configuration as well, the relative relationship between the threshold value and the processing target data in the quantization process, and the result of printing (1) or non-printing (0) obtained from the relative relationship can be made the same as those in the configuration of FIGS. 4A and 4B. That is, even in the case of a dot print pattern where the multiple colors are mixed, dot arrangement having blue noise characteristics can be achieved.

Further, the offset amount calculated by the offset amount calculation unit can be distributed to both of the threshold value and the processing target data. In either case, the effect of the first dither process as described above can be obtained as long as the relative relationship between the processing target data and the threshold value can be applied with an offset having an appropriate amount based on the pieces of reference data.

On the other hand, in the case where the second dither process is performed, the quantization process switching unit 311 provides the threshold value acquired by the threshold value acquisition unit 305 from the second threshold matrix to the quantization process unit 306. The second threshold value matrix includes threshold value matrices independent among the colors, and threshold values for the respective colors are independently provided to quantization process units 306 for the respective colors to perform quantization processes independent among the respective colors. For this reason, in a mixed color image formed using multiple print heads, as compared with the first dither process, the ratio at which dots of different colors are printed at the same pixel position increases.

FIGS. 6A to 8D are diagrams illustrating the results of the first and second dither processes. FIGS. 6A and 7A illustrate examples of the first threshold value matrix. Here, for the sake of simplicity, in a 16-pixel area consisting of 4×4 pixels, threshold values of 0 to 15 are set.

It is assumed here that pieces of density data on the first ink (black) and pieces of density data on the second ink (white) are equally (on a 50% basis (8/16)) inputted to all the pixels. In this case, the threshold value offset values for the respective ink colors are obtained from Expression 2, and the first ink threshold value offset value is Ofs_1(x, y)=0, whereas the second ink threshold value offset value is Ofs_2(x, y)=8. As a result, dots of the first ink are printed in pixels set with threshold values of 0 to 7 in the threshold value matrix illustrated in FIG. 6A. Also, from Expressions 3 and 4, dots of the second ink are printed in pixels set with threshold values of 8 to 15 in the threshold value matrix illustrated in FIG. 6A. FIG. 6B illustrates a dot print state in such a case. The first ink dots (black) and the second ink dots (white) are arrayed in a high dispersibility state without overlapping each other.

However, if a displacement of approximately a half-pixel size occurs between a print position of the print head ejecting the first ink and a print position of the print head ejecting the second ink, the first and second ink dot array state is disordered as illustrated in FIG. 6C. Many areas where the first ink dot and the second ink dot overlap each other and many blank areas W appear, and therefore it is forecasted to be different in hue and density from the state in FIG. 6B. Also, if the degree of print position displacement is changed depending on the position in a print medium due to cockling or the like, a print area as in FIG. 6B and a print area as in FIG. 6C alternately appear, and image defects such as density unevenness and color unevenness are recognized.

Also, FIGS. 7A to 7C illustrate the case where pieces of density data on the first to fourth inks are equally (on a 25% basis (4/16)) inputted to all the pixels. As in the case of FIGS. 6A to 6C, the threshold value offset values for the respective inks are obtained from Expression 2. That is, the first ink threshold value offset value is Ofs_1($x, y$)=0; the second ink threshold value offset value is Ofs_2($x, y$)=4; the third ink threshold value offset value is Ofs_3($x, y$)=8; and the fourth ink threshold value offset value is Ofs_4($x, y$)=12. As a result, dots of the first ink are printed in pixels set with threshold values of 0 to 3 in the threshold value matrix illustrated in FIG. 7A. Also, dots of the second ink, dots of the third ink, and dots of the fourth ink are printed in pixels set with threshold values of 4 to 7, in pixels set with threshold values of 8 to 11, and in pixels set with threshold values of 12 to 15, respectively. FIG. 7B illustrates a dot print state in such a case. The first to fourth ink dots are arrayed in a high dispersibility state without overlapping one another.

However, if a displacement of approximately a half-pixel size occurs between a print position of the print head ejecting the first and fourth inks and a print position of the print head ejecting the second and third inks, the dot array state is disordered as illustrated in FIG. 7C. Many areas where different ink dots overlap each other and many blank areas W appear, and therefore it is forecasted to be different in hue and density from the state in FIG. 7B. Also, if the degree of print position displacement is changed depending on the position in a print medium due to cockling or the like, a print area as in FIG. 7B and a print area as in FIG. 7C appear in a main scanning direction, and image defects such as density unevenness and color unevenness are recognized.

On the other hand, FIGS. 8A and 8B illustrate the second threshold value matrices referred to respectively for the first ink color and the second ink color. These two threshold value matrices are formed in a mutually low correlated state. As in the case of FIGS. 6A to 6C, it is here assumed that pieces of density data on the first ink (black) and the second ink (white) are equally (on a 50% basis (8/16)) inputted to all the pixels. In doing so, dots of the first ink and dots of the second ink are both printed at positions set with threshold values of 0 to 7 in the respective threshold value matrices. FIG. 8C illustrates a dot print state in such a case. The threshold value matrix for the first ink and the threshold value matrix for the second ink are not mutually exclusive. As a result, pixels where the first ink dot (black) and the second ink dot (white) overlap each other, and pixels where the first ink dot or the second ink dot is individually printed are produced. As compared with the dot arrangement state in the case of using the first threshold value (FIG. 6B), the overlap rate between the first ink dot and the second ink dot is high, and graininess is high.

However, in this example, even if a print position displacement of approximately a half-pixel size occurs between the print head ejecting the first ink and the print head ejecting the second ink, the first and second ink dot array state becomes as illustrated in FIG. 8D, and large disorder as in FIG. 6C does not occur. This is because areas where the first ink dot and the second ink dot overlap each other, and blank areas W are changed in position, but the total size of the areas is hardly changed. That is, in the case of performing the second dither process, even if print position displacement occurs, it is expected that variations in hue and density are small. As a result, even if the degree of print position displacement is changed depending on the position in a print medium due to cockling or the like, and consequently an area as in FIG. 8C and an area as in FIG. 8D alternately appear, image defects such as density unevenness and color unevenness are not easily recognized. The same holds true for the case of equally (on a 25% basis) inputting pieces of density data on the first to fourth ink dots to all the pixels.

As described, for the quantization process in the present embodiment, the two dither processes are prepared, i.e., the first dither process that can output an image having suppressed graininess, and the second dither process having superior resistance to a print position displacement.

FIG. 9 is a flowchart for explaining a dither process selecting process performed by the image processing apparatus main control unit 108. When this process is started, the image processing apparatus main control unit 108 checks various settings for a print operation as a processing target in step S501. As a result of checking the various settings, in the case of printing mode in which suppressing graininess is more important than suppressing defects associated with print position displacement, the process proceeds to Step S502, where the image processing apparatus main control unit 108 sets the first dither process. On the other hand, in the case of a print mode in which suppressing defects associated with print position displacement is more important than suppressing graininess, the process proceeds to Step S503, where the image processing apparatus main control unit 108 sets the second dither process. This completes the dither process selecting process. In the case where the first dither process is set, the threshold value acquisition unit 305 acquires a threshold value from the first threshold value matrix stored in the memory 310 and provides it to the color correlating process unit. The color correlating process unit 304 performs the series of processing steps described with FIG. 4B, and the quantization process switching unit 311 provides a threshold value acquired from the color correlating process unit 304 to the quantization process unit 306. On the other hand, in the case where the second dither process is set, the threshold value acquisition unit 305 acquires threshold values from the second threshold value matrices to provide them to the quantization process switching unit 311, and the quantization process switching unit 311 provides them to the quantization process unit 306.

FIG. 10 is a diagram for explaining a specific example of the determination process in Step S501. The image processing apparatus main control unit 108 can determine which of the dither processes should be selected, on the basis of, for example, the type of a print medium to be used. Specifically, in the case where the print medium is photo paper, each dot is conspicuous, and cockling does not easily occur because the rigidity of the medium is high. Accordingly, the image processing apparatus main control unit 108 sets the first dither process. On the other hand, in the case where the print medium is plain paper, each dot is inconspicuous, and cockling easily occurs because the rigidity of the medium is low. Accordingly, the image processing apparatus main control unit 108 sets the second dither process.

Cockling that is one of the causes for the occurrence of print position displacement will now be briefly described. In an inkjet printing apparatus, when fibers in a print medium are contracted by ink application or depending on a use environment, cockling (paper surface undulation) may occur to vary the distance between the print medium and a print head (head-medium distance) depending on a position on the print medium. Also, in an inkjet printing apparatus adapted to print an image by ejecting inks from a print head in relative movement, such a variation in head-medium distance causes print position displacement. That is, when printing an image on a print medium easily causing cockling, the degree of print position displacement is also varied depending on a position on the print medium, and density unevenness and color unevenness are easily recognized. For this reason, in the present embodiment, for plain paper easily causing cockling, the second dither process resistant to print position displacement is set, whereas for photo paper not easily causing cockling, the first dither process resulting in suppressed graininess is set.

Also, the degree of defects associated with print position displacement also varies depending on a dot size. This is because even in the case of the same amount of print position displacement, in the case where each dot is small, variations in the total sizes of overlap areas and blank areas are large. Accordingly, it can also be possible to, in the case of printing large dots, give priority to a reduction in graininess over image defects associated with print position displacement to set the first dither proves, and in the case of printing small dots, give priority to a reduction in image defect associated with print position displacement over a reduction in graininess to set the second dither process. Also, even in the case of ejecting the same amount of ink, the size of a dot formed on a print medium varies depending on the type of the ink or the bleeding rate of the print medium. Accordingly, it is also possible to, for example, in the case of using dye ink likely to spread on a print medium, set the first dither process, and in the case of using pigment ink unlikely to spread on a print medium, set the second dither process. Further, it is also possible to, in the case of a print medium having a large bleeding rate, set the first dither process, and in the case of a print medium having a small bleeding rate, set the second dither process.

In addition, the print position displacement is also affected by an ejection frequency of a print head. This is because a large ejection frequency causes an air stream around, and affects a traveling direction of ink droplets. Accordingly, in the case of performing multipass printing, an ejection frequency in each scan is suppressed small to make it difficult to cause an air flow. As a result, a reduction in graininess is given priority over image defects associated with print position displacement, and therefore it is desirable to set the first dither process. On the other hand, in the case of performing one-pass printing, an ejection frequency in each scan is large, and an air flow is easily caused. As a result, a reduction in image defects associated with print position displacement is given priority over graininess, and therefore it is desirable to set the second dither process. In so doing, a dither process is not made difference between the one-pass printing and the multipass printing, but may be performed such that for multipass printing having N passes or more, the first dither process is performed, and for one-pass printing and multipass printing having less than N passes, the second dither process is performed.

Further, the print position displacement is also affected by a scanning speed of a print head (carriage scanning speed). This is because as the carriage scanning speed is increased, an effect of an error in the speed on print position displacement increases. Accordingly, in the case of a relatively small carriage speed, the degree of print position displacement associated with an error in the carriage speed is small, and therefore it is desirable that a reduction in graininess is given priority to set the first dither process. On the other hand, in the case of a relatively large carriage speed, the degree of print position displacement associated with an error in the carriage speed is large, and therefore it is desirable that a reduction in image defects associated with the print position displacement is given priority to set the second dither process.

Still further, the print position displacement is also affected by the distance between an ejection port surface of a print head and a print medium (head-medium distance). This is because as the head-medium distance is increased, print position displacement associated with an error in carriage speed or ejection speed increases. Accordingly, it is also possible that, in the case of a small head-medium distance, a reduction in graininess is given priority to set the first dither process, and in the case of a large head-medium distance, a reduction in image defects associated with print position displacement is given priority to set the second dither process.

Yet further, the print position displacement is also affected by an ejection speed of an ink droplet from a print head. This is because as the ejection speed is decreased, it takes more time to land on a print medium, and therefore print position displacement associated with an error in carriage speed or cockling increases. Accordingly, it is also possible that in the case of a large ejection speed, a reduction in graininess is given priority to set the first dither process, and in the case of a small ejection speed, a reduction in image defects associated with print position displacement is given priority to set the second dither process.

Also, in a serial type inkjet printing apparatus, in the case of bidirectionally scanning a print head to print an image, the degree of print position displacement increases as compared with the case of unidirectionally scanning the print head to print an image. Accordingly, it is also possible that in the case of the unidirectional scan printing, a reduction in graininess is given priority to set the first dither process, and in the case of the bidirectional scan printing, a reduction in image defects associated with print position displacement is given priority to set the second dither process.

Further, the effect of print position displacement varies depending on whether or not marginless printing is performed. In the case of margin printing, since even at timing when the front end or rear end of an image is printed, the front and rear ends of a print medium can be securely pressed down, a head-medium distance is kept, and print position displacement is unlikely to occur. Accordingly, in the case of the margin printing, a reduction in graininess may be given priority to set the first dither process. On the other hand, in the case of the marginless printing, since at timing when the front end or rear end of an image is printed, a print medium cannot be securely pressed down, a head-medium distance becomes unstable, and therefore print position displacement is likely to occur. Accordingly, in the case of the marginless printing, a reduction in image defects associated with print position displacement is given priority over graininess, and therefore it is desirable to set the second dither process.

Still further, the effect of print position displacement varies depending on whether single-sided printing or double-sided printing is performed on a print medium. In the case of the single-sided printing on a print medium, an ink application amount is not so large, and therefore the degree of cockling is also small. Accordingly, in the case of the single-sided printing, it is desirable that a reduction in graininess is given priority over a reduction in image defects associated with print position displacement to set the first dither process. On the other hand, in the case of double-sided printing on a print medium, an ink application amount is large, and therefore cockling is a concern. Accordingly, in the case of the double-sided printing, it is desirable that a reduction in image defects associated with print position displacement is given priority over graininess to set the second dither process. However, even in the case of the double-sided printing, at timing of printing on a first side, the degree of print position displacement is comparable to that in the case of the single-sided printing. Accordingly, it may be configured to perform the first dither process for the first side, and perform the second dither process for the second side to be subsequently printed.

Also, the effect of print position displacement varies depending on the degree of vibration caused by a factor other than a printing action. For example, in a printing apparatus having a copy function, a reading action by a scanner device and a printing action are simultaneously performed, and vibration associated with the reading action by the scanner device may affect print position displacement. In such a case, it is desirable that in a mode in which the scanner device is not activated, such as a PC print mode or a camera direct print mode, a reduction in graininess is given priority over a reduction in image defects associated with print position displacement to set the first dither process. On the other hand, at the time of printing a copy, or at the time of activating a scanner, such as at the time of scanner reading, it is desirable that a reduction in image defects associated with print position displacement is given priority over graininess to set the second dither process.

As the cause for the vibration, not only the scanner device but also an irregular action such as a print medium feeding action can be cited. In this regard, for example, in a print mode in which during a printing action for the current page, a sheet feeding action for the next page is not performed, it is desirable that a reduction in graininess is given priority over a reduction in image defects associated with print position displacement to set the first dither process. On the other hand, in a print mode in which during a printing action for the current page, a sheet feeding action for the next page is performed, it is desirable that a reduction in image defects associated with print position displacement is given priority over graininess to set the second dither process.

In addition to the vibration as the above-described external factor, the effect of a variation in the scanning start position of a print head of a printing apparatus itself on a landing position is also present. In a print mode in which every time scanning is performed, printing is performed from the same position, a vibration situation is the same between respective scans, and therefore it is desirable that a reduction in graininess is given priority over a reduction in image defects associated with print position displacement to set the first dither process. On the other hand, in a print mode in which every time scanning is performed, printing is performed from a different position, the vibration situation is different between respective scans, and therefore it is desirable that a reduction in image defects associated with print position displacement is given priority over a reduction in graininess to set the second dither process. In other words, this means it is preferable that, among multiple print modes, the first dither process is set for a print mode in which the variation in the print start position is relatively smaller, whereas the second dither process is set for a print mode in which the variation is relatively larger.

Further, the above description is given on the basis of the configuration where depending on which of the suppression of graininess and the suppression of defects associated with print position displacement is given priority, the switch between the first dither process and the second dither process is made. However, depending on the degree of an image processing load, the switch may be made. Specifically, since the first dither process uses a threshold value matrix common to respective ink colors, a quantization processing load is small and high speed processing is possible as compared with the case of using threshold matrices for respective ink colors as the case of the second dither process. Accordingly, it may be configured to, in the case of printing a high resolution image requiring a larger processing load, perform the first dither process, and in the case of printing a low resolution image requiring a smaller processing load, perform the second dither process.

In the above, the examples of a determination rule for setting which of the first dither process and the second dither process are described; however, the determination rule is not limited to any of the above examples. The determination may be made on the basis of another condition different from any of the above examples. In either case, as long as the first dither process using a threshold value having a tendency exclusive among the respective colors and the second dither process using a threshold value having a tendency independent among the respective colors are prepared and one of the dither processes is selected depending on various conditions, the effect of the present invention can be obtained. That is, even in the case where print position displacement occurs, defects associated with the print position displacement can be prevented from easily appearing on the image while achieving a mixed color image having suppressed graininess and superior dispersibility.

Second Embodiment

In the first embodiment, described is the configuration where the multiple threshold value matrices having various sizes and shapes are preliminarily stored in the fixed memory 310, and from among the threshold value matrices, the threshold value acquisition unit 305 selects a threshold value matrix corresponding to a print mode. On the other hand, the present embodiment is configured to use a rewritable storage area incorporated in a processing circuit as a memory 310, and externally read and use a threshold value matrix to be used. In such a memory configuration, although high-speed processing is achievable, cost and power consumption are large, and therefore it is preferable to efficiently utilize the memory 310 while using the smallest possible capacity.

FIGS. 11A and 11B are block diagrams for explaining a first dither process and a second dither process in the present embodiment. In the case of performing the first dither process, as illustrated in FIG. 11A, a threshold value matrix having 32×16 pixels is read in the memory 310. Then, threshold value acquisition units 305 on respective planes generate threshold values applied with offsets in corresponding respective color correlating process units 304 while utilizing the common threshold value matrix, and thereby processes similar to the first dither process as in the first embodiment are performed. On the other hand, in the case of performing the second dither process, as illustrated in FIG. 11B, a threshold value matrix A having 16×16 pixels and a threshold value matrix B having 16×16 pixels are read in the memory 310. Then, each of the threshold value acquisition units 305 on the planes provides any one of the first and second threshold value matrices to a corresponding quantization process unit 306 to perform the second dither process.

When comparing FIGS. 11A and 11B with each other, in the present embodiment, despite using the memory area having the same capacity, the threshold value matrix used for the first dither process can increase a capacity twice or more as compared with the threshold value matrices used for the second dither process. For this reason, in the first dither process in the present embodiment, the repetition period of the threshold value matrix can be made larger than that in the second dither process, and therefore periodic unevenness such as texture can be further suppressed.

Note that the above second dither process is configured to prepare the threshold value matrices for two colors, but may be configured to use threshold value matrices respectively for inks of four colors. In this case, when preparing a threshold value matrix having 16×16 pixels for each of the ink colors in the second dither process, the threshold value matrix in the first dither process has an area of 64×16 pixels.

Meanwhile, the above embodiments are described taking as an example the configuration where the first dither process uses a threshold value matrix having blue noise characteristics, and an offset is added to a threshold value depending on an input value of a reference color; however, the first dither process is not limited to the above-described configuration. Also, for the second dither process as well, it is not necessarily required to use a threshold value matrix of a halftone dot shape as described above. It is not necessarily required that the first threshold value matrix used for the first dither process has blue noise characteristics, and that the completely exclusive process based on the one threshold value matrix is performed. Also, the second threshold matrices used for the second dither process may be ones having blue noise characteristics. In either case, as long as the dispersibility of the sum of dot arrangements of the respective colors and the exclusiveness among the respective colors in the first threshold value matrix are higher than those in each of the second threshold value matrices, these threshold value matrices can be utilized as the first and second threshold value matrices in the present invention.

FIGS. 12A to 12D and FIGS. 13A to 13D are diagrams illustrating a variation of threshold value matrices usable for the first dither process and the second dither process. FIGS. 12A and 12B illustrate first threshold value matrices usable for the first dither process. Although these two threshold value matrices are separately provided, dot arrangement almost exclusive and superior in dispersibility can be obtained by applying threshold value offsets. When comparing the both diagrams with each other, it turns out that the pixel positions of threshold values 7 and 8 indicated by underlines are reversed. FIG. 12C illustrates a dot arrangement state in the case of printing dots using the threshold value matrices as in FIGS. 12A and 12B. FIG. 12C illustrates the case where in the same manner as that in FIG. 6B, pieces of density data on a first ink (black) and pieces of density data on a second ink (white) are equally (on a 50% basis (8/16)) inputted to all pixels. Further, FIG. 12D illustrates a dot arrangement state in the case where print position displacement occurs between the print head ejecting the first ink and that ejecting the second ink. Although not completely the same as the case in FIG. 6C, it can be expected that many areas where the first ink dot and the second ink dot overlap each other, and many blank areas W appear, and image defects such as density unevenness and color unevenness are recognized.

On the other hand, FIGS. 13A and 13B illustrate second threshold value matrices usable for the second dither process. FIG. 13A illustrates the same matrix as FIG. 8A, and between the threshold value matrices in FIGS. 13B and 8B, the pixel positions of threshold values 7 and 8 indicated by underlines are reversed. FIG. 13C illustrates a dot arrangement state in the case of printing dots using the threshold value matrices as in FIGS. 13A and 13B. FIG. 13C illustrates the case where in the same manner as that in FIG. 8C, pieces of density data on the first ink (black) and pieces of density data on the second ink (white) are equally (on a 50% basis (8/16)) inputted to all pixels. Further, FIG. 13D illustrates a dot arrangement state in the case where print position displacement occurs between the print head ejecting the first ink and that ejecting the second ink. Although not completely the same as the case in FIG. 8D, it can be expected that variations in areas where the first ink dot and the second ink dot overlap each other, and in blank areas W are small, and it is unlikely to recognize image defects such as density unevenness and color unevenness.

As described, in the case of using the threshold value matrices as in FIGS. 12A and 12B for the first dither process, a completely exclusive relationship as in the case of using FIG. 6A cannot be obtained between the first ink and the second ink. However, as with the first dither process in the first embodiment, the effect suppressing graininess low can be obtained. Also, in the case of using the threshold value matrices as in FIGS. 13A and 13B for the second dither process, completely the same dot arrangement state as in the case of using FIGS. 8A and 8B cannot be obtained. However, as with the second dither process in the first embodiment, the effect that even in the case where print position displacement occurs, it is unlikely to recognize image defects such as density unevenness and color unevenness can be obtained. As described, as long as the relative relationship as described above can be obtained between a first threshold value matrix and a second threshold value matrix, these threshold value matrices can be utilized for each of the first dither process superior in dispersibility and the second dither process superior in resistance to print position displacement.

Note that the above description is given using FIGS. 6A to 8D, and 12A to 13D for the case where the printing ratios of the multiple ink colors are substantially the same, and the total of the printing ratios is 100%. This is because such printing ratios make graininess and defects caused by print position displacement most conspicuous, and therefore the effect of the present invention is likely to be most clearly seen. Conversely, as long as the distinctive features of the first dither process "superior in dispersibility and having suppressed graininess" and the distinctive feature of the second dither process "highly resistant to print position displacement" are obtained near such density, they are not necessarily required to be obtained in the entire gradation range.

Further, the above description is given on the basis of the configuration where the print element arrays for large dots of the four colors of cyan, magenta, yellow, and black, and the print element arrays for small dots of the four colors are used; however, needless to say, the present invention is not limited to such a configuration. As an ink color, a color that is of the same type but has different density, such as LC (light cyan), LM (light magenta), or Gray (gray), or a color such as R (red), G (green), or B (blue) may be further added.

Also, the above embodiments are described on the basis of the configuration where all the steps illustrated in FIG. 2 are performed in the image processing apparatus 2; however, as long as each of the above processes is performed in the inkjet printing system in the embodiments illustrated in FIG. 1, the steps may be performed in any device. For example, a configuration where the steps up to the quantization in Step S203 are performed by the image processing apparatus 2, and the index process in Step S204 is performed in the printing apparatus 1 is also possible. Also, it may be configured that the printing apparatus 1 includes the image data generating function of the image processing apparatus 2 described above, and all the steps subsequent to Step S201 are performed in the printing apparatus 1. In this case, the printing apparatus 1 serves as the image processing apparatus of the present invention.

In addition, a bit number of input/output data in each of the above-described steps is not limited to that in the above-described embodiments. In order to keep accuracy, an output bit number may be made larger than an input bit number, and a bit number may be variously adjusted depending on application or situations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-031836, filed Feb. 20, 2015, which is hereby incorporated by reference wherein in its entirety.

What is claimed is:
1. An image processing apparatus for processing data used for printing an image on a print medium by ejecting multiple types of mutually different inks from a print unit, the image processing apparatus comprising:
a memory storing computer executable code; and
one or more processors which executes the code to perform the following steps:
determining a print operation to be performed, from among multiple print operations, which perform printing with use of the print unit, at least including a first print operation and a second print operation, wherein an unevenness of an image due to a displacement of a print position on a print medium in the second print operation is larger than an unevenness of an image due to a displacement of a print position on a print medium in the first print operation;
acquiring multi-valued data for each of the multiple types of inks;
generating, in accordance with the determined print operation to be performed, quantized data for printing a dot by comparing a threshold value acquired by a threshold value acquisition unit, wherein the threshold value is arranged in a threshold value matrix providing an array of threshold values corresponding to pixel positions and corresponds to the target pixel, and the multi-valued data with each other for each of the multiple types of inks; and
outputting the generated quantized data used by the print unit to eject multiple types of inks,
wherein, in a case where the determined print operation is the second print operation, the generating generates quantized data for a first type of ink with use of threshold values obtained from a first threshold value matrix and generates quantized data for a second type of ink with use of threshold values obtained from a second threshold value matrix having different threshold value arrangements than the first threshold value matrix, and
wherein, in a case where the determined print operation is the first print operation, a dot arrangement of the first and second types of inks printed on the print medium by the print unit on a basis of the generated quantized data is higher in exclusiveness and dispersibility between or among dots of the first and second types of inks and lower in an overlap rate between or among the dots of the first and second types of inks than a dot arrangement of the multiple types of inks printed on the print medium by the print unit on a basis of the generated quantized data in the case where the determined print operation is the second print operation.

2. The image processing apparatus according to claim 1, wherein:
in the case where the determined print operation is the first print operation, the generating generates quantized data for the first type of ink with use of threshold values obtained from a third threshold value matrix, and offsets the threshold values of the third threshold value matrix on the basis of the multi-valued data for the first type of ink, and the generating generates quantized data for the second type of ink with use of the offset threshold values.

3. The image processing apparatus according to claim 2, wherein the third threshold value matrix has a blue noise characteristic.

4. The image processing apparatus according to claim 3, wherein each of the first and second threshold value matrices is a threshold value matrix providing a threshold value array by which a dot arrangement of a halftone dot shape is provided as a result of a quantization process of halftone multi-valued data.

5. The image processing apparatus according to claim 2, wherein:
- a memory area adapted to, in the case where the determined print operation is the first print operation, store the third threshold value matrix, and a memory area adapted to, in the case where the determined print operation is the second print operation, store the first and second threshold value matrices separately respectively prepared for the first and second types of inks are same; and
- a capacity of the third threshold value matrix is twice or more than a capacity of the first and second threshold value matrix corresponding to one ink.

6. The image processing apparatus according to claim 1, wherein the first print operation is a print operation for photo paper, and the second print operation is a print operation for plain paper.

7. The image processing apparatus according to claim 1, wherein the first print operation is a print operation using multipass printing of which a relative pass number between the print medium and the print unit is N or more, and the second print operation is a print operation using multipass printing of which the relative pass number is less than N or one-pass printing.

8. The image processing apparatus according to claim 1, wherein in the first print operation, a distance between the print medium and the print unit is a predetermined distance, and in the second print operation, the distance is larger than the predetermined distance.

9. The image processing apparatus according to claim 1, wherein the first print operation is a single-sided print operation that performs printing only on a single side of a print medium, and the second print operation is a double-sided print operation that performs printing on both sides of a print medium.

10. The image processing apparatus according to claim 1, wherein he first print operation is a print operation for a front surface of a print medium in a double-sided print operation that performs printing on both sides of a print medium, and the second print operation is a print operation for a back surface of the print medium of which the front surface is printed in the double-sided print operation.

11. The image processing apparatus according to claim 1, wherein the first print operation is a print operation that forms a dot having a first size on the print medium, and the second print operation is a print operation that forms a dot having a second size smaller than the first size on the print medium.

12. The image processing apparatus according to claim 1, wherein in the first print operation, a relative scanning speed between the print unit and the print medium is a predetermined speed, and in the second print operation, the relative scanning speed is larger than the predetermined speed.

13. The image processing apparatus according to claim 1, wherein in the first print operation, the first and second types of inks are ejected from the print unit at a first ejection speed, and in the second print operation, the print unit ejects the first and second types of inks at a second ejection speed lower than the first ejection speed.

14. The image processing apparatus according to claim 1, wherein the first print operation is a print operation based on unidirectional scanning of the print unit with respect to a print medium, and the second print operation is a print operation based on bidirectional scanning of the print unit with respect to a print medium.

15. The image processing apparatus according to claim 1, wherein the first print operation is a margin print operation that performs printing with margins being provided along sides of the print medium, and the second print operation is a marginless print operation that performs printing without providing any margin along the sides of the print medium.

16. The image processing apparatus according to claim 1, wherein the generating includes the multi-valued data to the quantized data having three or more values in either case of the first print operation or the second print operation.

17. The image processing apparatus according to claim 1, wherein in the first print operation, a degree of an effect of vibration of a printing apparatus on print position displacement in an active printing action is a first degree, and in the second print operation, the degree is larger than the first degree.

18. The image processing apparatus according to claim 17, wherein a printing apparatus comprising the print unit further comprises a scanner device configured to read a manuscript, and the effect of the vibration is an effect of vibration caused by at least one of a reading action by the scanner device and a printing action by the printing apparatus.

19. The image processing apparatus according to claim 1, wherein in the first print operation, the number of variations in a start position where the print unit starts to scan a print medium is a first number, and in the second print operation, the number is larger than the first number.

20. The image processing apparatus according to claim 2, wherein the first and second types of inks have mutually different colors.

21. The image processing apparatus according to claim 1, wherein:
- a printing apparatus comprising the print unit further comprises a scanner device configured to read a manuscript; and
- in the printing apparatus, in the first print operation, printing by the print unit is performed without performing a reading action by the scanner device, whereas in the second print operation, the printing by the print unit is performed during performing the reading action by the scanner device.

22. The image processing apparatus according to claim 1, further comprising the print unit.

23. The image processing apparatus according to claim 21, wherein the image processing apparatus is an image printing apparatus.

24. An image processing method for printing an image on a print medium by ejecting multiple types of mutually different inks from a print unit, the image processing method comprising:
- a determination step of determining a print operation to be performed, from among multiple print operations, which perform printing with use of the print unit, at least including a first print operation and a second print operation, wherein an unevenness of an image due to a displacement of a print position on a print medium in the second print operation is larger than an unevenness of an image due to a displacement of a print position on a print medium in the first print operation;
- a data acquisition step of acquiring multi-valued data for each of the multiple types of inks;
- a generation step of, in accordance with the determined print operation to be performed, generating quantized data for printing a dot by comparing a threshold value acquired by a threshold value acquisition unit, wherein the threshold value is arranged in a threshold value matrix providing an array of threshold values corresponding to pixel positions and corresponds to the target pixel, and the multi-valued data with each other for each of the multiple types of inks; and a print step of the print unit ejecting multiple types of inks on the basis of the generated quantized data, wherein, in a case were the determined print operation is the second print operation, the generation step generates quantized data for a first type of ink with use of threshold values obtained from a first threshold value matrix and generates quantized data for a second type of ink with use of threshold values obtained from a second threshold value matrix having different threshold value arrangements than the first threshold value matrix, and wherein, in a case where the determined print operation is the first print operation, a dot arrangement of the first and second types of inks printed on the print medium by the print unit on a basis of quantized data generated by the generation step is higher in exclusiveness and dispersibility between or among dots of the first and second types of inks and lower in an overlap rate between or among the dots of the first and second types of inks than a dot arrangement of the first and second types of inks printed on the print medium by the print unit on a basis of the quantized data generated by the generation step in the case where the determined print operation is the second print operation.

25. An image processing apparatus for printing an image on a print medium by ejecting multiple types of mutually different inks from a print unit, the image processing apparatus comprising:

a memory storing computer executable code; and one or more processors which executes the code to perform the following steps:

determining a print operation to be performed, from among multiple print operations, which perform printing with use of the print unit, at least including a first print operation and a second print operation, wherein an unevenness of an image due to a displacement of a print position on a print medium in the second print operation is larger than an unevenness of an image due to a displacement of a print position on a print medium in the first print operation;

acquiring multi-valued data for each of the multiple types of inks;

quantizing the acquired multi-valued data on the basis of a threshold value matrix in which a plurality of threshold values are arranged, in accordance with the determined print operation to be performed; and outputting the quantized data used by the print unit to eject multiple types of inks, wherein, in a case where the determined print operation is the second print operation, the quantizing quantizes the acquired multi-valued data for a first type of ink by using a first threshold value matrix, and quantizes the acquired multi-valued data for a second type of ink by using a second threshold value matrix, wherein an arrangement of threshold values in the first threshold value matrix is different from an arrangement of threshold values in the second threshold value matrix, and wherein, in a case where the determined print operation is the first print operation, the quantizing quantizes the acquired multi-valued data for the first type of ink by using a third threshold value matrix, offsets the threshold values of the third threshold value matrix on the basis of the acquired multi-valued data for the first type of ink, and quantizes the acquired multi-valued data for the second type of ink by using the offset threshold values.

26. The image processing apparatus according to claim 25, wherein the third threshold value matrix has blue noise characteristic.

27. The image processing apparatus according to claim 25, wherein the quantizing performs, in a case of determining to perform the first print operation, offsetting the threshold values of third threshold value matrix by subtracting a value of the acquired multi-valued data for the first type of ink from the third threshold value matrix.

28. The image processing apparatus according to claim 25, wherein each of the first and second threshold value matrix have blue noise characteristic.

29. The image processing apparatus according to claim 25, wherein positions of threshold values which is lower than a predetermined threshold value in the first threshold value matrix partly overlap to a position of threshold values which is lower than the predetermined threshold value in the second threshold value matrix.

30. The image processing apparatus according to claim 25, wherein the first print operation is a print operation for photo paper, and the second print operation is a print operation for plain paper.

31. The image processing apparatus according to claim 25, wherein the first print operation is a print operation using multipass printing of which a relative pass number between the print medium and the print unit is N or more, and the second print operation is a print operation using multipass printing of which the relative pass number is less than N or one-pass printing.

32. The image processing apparatus according to claim 25, wherein in the first print operation, a degree of an effect of vibration of a printing apparatus on print position displacement in an active printing action is a first degree, and in the second print operation, the degree is larger than the first degree, the printing apparatus comprising the print unit and further comprises a scanner device configured to read a manuscript, and the effect of the vibration is an effect of vibration caused by at least one of a reading action by the scanner device and a printing action by the printing apparatus.

33. An image processing apparatus for printing an image on a print medium by ejecting multiple types of mutually different inks from a print unit, the image processing apparatus comprising:

a memory storing computer executable code; and one or more processors which executes the code to perform the following steps:

determining a print operation to be performed, from among multiple print operations, which perform printing with use of the print unit, at least including a first print operation and a second print operation, wherein an unevenness of an image due to a displacement of a print position on a print medium in the second print operation is larger than an unevenness of an image due to a displacement of a print position on a print medium in the first print operation;

acquiring multi-valued data for each of the multiple types of inks;

quantizing the acquired multi-valued data on the basis of a threshold value matrix in which a plurality of threshold values are arranged, in accordance with the determined print operation to be performed; and outputting the quantized data used by the print unit to eject multiple types of inks, wherein, in a case where the determined print operation is the second print operation, the quantizing quantizes the acquired multi-valued data for a first type of ink by using a first threshold value matrix, and quantizes the acquired multi-valued data for a second type of ink by using a second threshold value matrix, wherein an arrangement of threshold values in the first threshold value matrix is different from an arrangement of threshold values in the second threshold value matrix, and wherein, in a case where the determined print operation is the first print operation, the quantizing quantizes the acquired multi-valued data for the first type of ink by using a third threshold value matrix, offsets the acquired multi-valued data for the second type of ink on the basis of the acquired multi-valued data for the first type of ink, and quantizes the offset multi-valued data for the second type of ink by using the third threshold value matrix.

34. The image processing apparatus according to claim 33, wherein the quantizing performs, in a case of determining to perform the first print operation, offsetting the acquired multi-valued data for the second type of ink by adding a value of the acquired multi-valued data for the first type of ink to the acquired multi-valued data for the first type of ink.

* * * * *